US010802942B2

(12) United States Patent
Agerstam et al.

(10) Patent No.: US 10,802,942 B2
(45) Date of Patent: Oct. 13, 2020

(54) METHODS AND APPARATUS TO DETECT ANOMALIES OF A MONITORED SYSTEM

(71) Applicant: Intel Corporation, Santa Clara, CA (US)

(72) Inventors: Mats Agerstam, Portland, OR (US); Bahareh Sadeghi, Portland, OR (US); Jason Martin, Beaverton, OR (US); Jeffrey Ota, Morgan Hill, CA (US); Justin Gottschlich, Santa Clara, CA (US); Marcos Carranza, Portland, OR (US); Maria Ramirez Loaiza, Beaverton, OR (US); Alexander Heinecke, San Jose, CA (US); Mohammad Mejbah Ul Alam, Milpitas, CA (US); Robert Colby, Granite Bay, CA (US); Sara Baghsorkhi, Los Gatos, CA (US); Shengtian Zhou, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/235,959

(22) Filed: Dec. 28, 2018

(65) Prior Publication Data
US 2019/0138423 A1    May 9, 2019

(51) Int. Cl.
*G06F 11/34* (2006.01)
*H04L 12/24* (2006.01)
(Continued)

(52) U.S. Cl.
CPC ........ *G06F 11/3447* (2013.01); *G06F 11/008* (2013.01); *G06F 11/3452* (2013.01);
(Continued)

(58) Field of Classification Search
CPC ... H04L 41/16; H04L 41/0893; H04L 41/142; H04L 41/145; H04L 12/66; H04L 41/147;
(Continued)

(56) References Cited

U.S. PATENT DOCUMENTS

| 2013/0190095 A1* | 7/2013 | Gadher ................ G06F 11/008 463/42 |
| 2018/0130032 A1* | 5/2018 | Bae ........................ G06N 7/005 |

(Continued)

OTHER PUBLICATIONS

Branch et al., "In-Network Outlier Detection in Wireless Sensor Networks," Knowledge and Information Systems, vol. 34, Jan. 2013, pp. 23-54, 31 pages.

(Continued)

*Primary Examiner* — Abdullahi E Salad
(74) *Attorney, Agent, or Firm* — Hanley, Flight & Zimmerman, LLC

(57) ABSTRACT

An apparatus includes a data interface to obtain first sensor data from a first sensor and second sensor data from a second sensor of a monitored system; a data analyzer to extract a feature based on analyzing the first and second sensor data using a model, the model trained based on historical sensor data, the model to determine the feature as a deviation between the first and second sensor data to predict a future malfunction of the monitored system; an anomaly detector to detect an anomaly in at least one of the first sensor data or the second sensor data based on the feature, the anomaly corresponding to the future malfunction of the monitored system; and a system applicator to modify operation of the monitored system based on the anomaly.

24 Claims, 17 Drawing Sheets

(51) Int. Cl.
*G06F 11/00* (2006.01)
*H04L 29/06* (2006.01)
*H04L 29/08* (2006.01)
*G06K 9/62* (2006.01)
*H04L 12/66* (2006.01)
*G06N 20/00* (2019.01)

(52) U.S. Cl.
CPC ........ *G06F 11/3466* (2013.01); *G06K 9/6217* (2013.01); *G06N 20/00* (2019.01); *H04L 12/66* (2013.01); *H04L 41/142* (2013.01); *H04L 41/145* (2013.01); *H04L 41/147* (2013.01); *H04L 63/1425* (2013.01); *H04L 67/12* (2013.01); *G06F 2201/875* (2013.01)

(58) Field of Classification Search
CPC ... H04L 63/1425; H04L 67/12; G06K 9/6262; G06K 9/6217; H04W 4/70; H04W 12/009; H04W 4/38; G06F 11/20; G06F 11/3452; G06F 11/008; G06F 11/0793; G06F 11/0739; G06F 11/3466; G06F 2201/875; G06F 11/3447; G06F 11/0751; G06N 20/00; G06N 20/10; G06N 3/0445; G06N 7/005; G06N 3/08
See application file for complete search history.

(56) References Cited

U.S. PATENT DOCUMENTS

2018/0316555 A1* 11/2018 Salgueiro ............ H04L 41/0853
2018/0375743 A1* 12/2018 Lee ......................... H04L 29/08
2019/0004891 A1* 1/2019 Bi .......................... G06F 11/0793

OTHER PUBLICATIONS

Elnahrawy et al., "Context-Aware Sensors," Wireless Sensor Networks, vol. 2920, 2004, pp. 77-93, 17 pages.

Komurlu et al., "Active Inference and Dynamic Gaussian Bayesian Networks for Battery Optimization in Wireless Sensor Networks," AAAI Technical Report WS-16-04, Mar. 29, 2016, pp. 241-247, 7 pages.

Zhang et al., "Adaptive and Online One-Class Support Vector Machine-Based Outlier Detection Techniques for Wireless Sensor Networks," 2009 International Conference on Advanced Information Networking and Applications Workshops, May 26, 2009, pp. 990-995, 7 pages.

Pan et al., "A Survey on Transfer Learning," IEEE Transactions on Knowledge and Data Engineering, vol. 22, Issue 10, Oct. 2010, pp. 1345-1359, 15 pages.

* cited by examiner

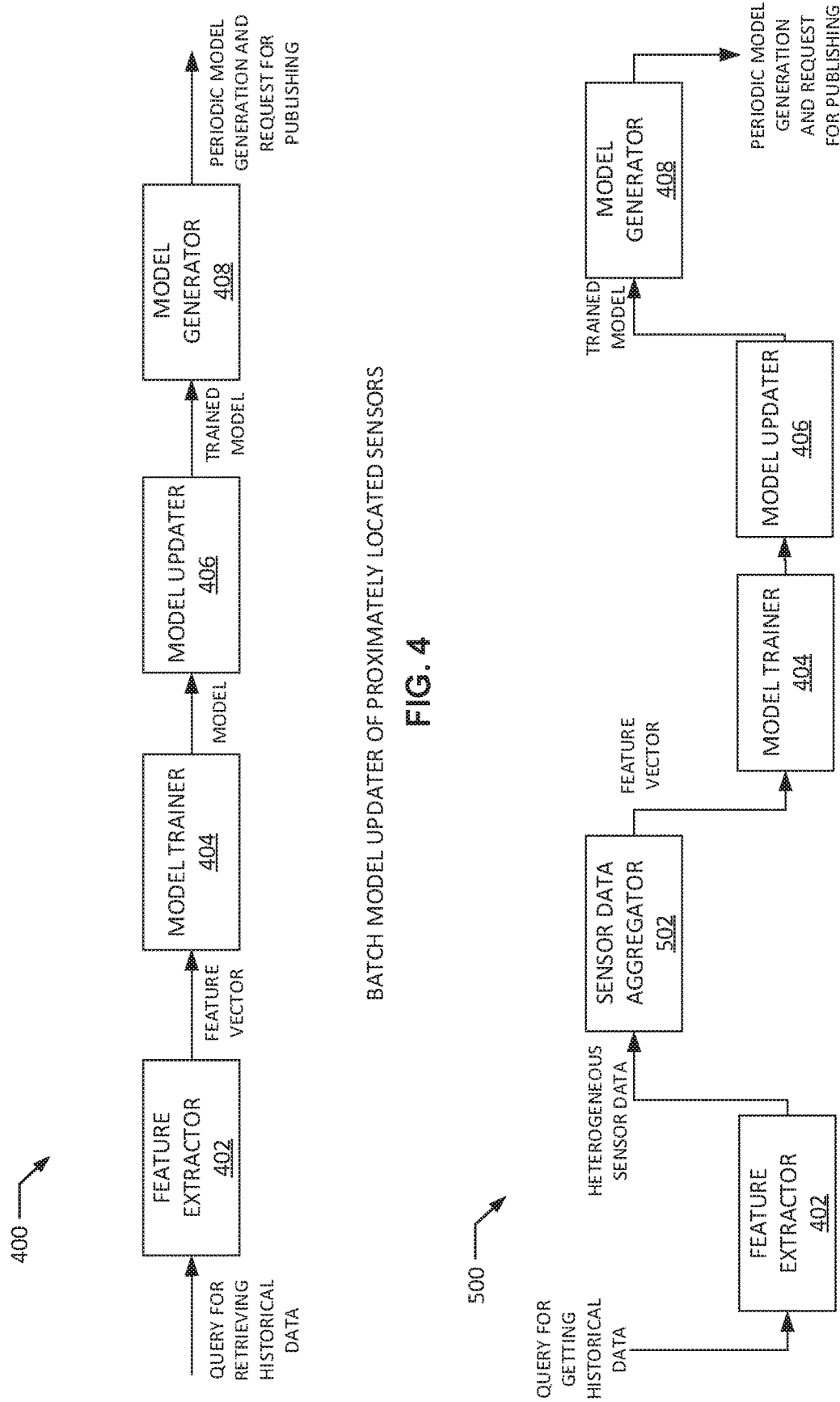

US 10,802,942 B2

METHODS AND APPARATUS TO DETECT ANOMALIES OF A MONITORED SYSTEM

FIELD OF THE DISCLOSURE

This disclosure relates generally to detecting anomalies, and, more particularly, to detecting anomalies of a monitored system.

BACKGROUND

Machine learning is a type of artificial intelligence that provides computers with the ability to learn without being explicitly programmed. Machine learning focuses on systems that can change when exposed to new data. Anomaly detection is the process of identifying outliers in the inputs for a problem domain (e.g., data accuracy in an IoT environment). Example anomalies include, but are not limited to, a faulty sensor, a credit card fraud, a failure in a mechanical part or control system, etc. Some example impacts of anomalies include, but are not limited to, monetary losses, property damage, loss of life, etc.

BRIEF DESCRIPTION OF THE DRAWINGS

FIG. 4 is a block diagram of an example batch model updater of proximately located sensors in a training mode to implement the example batch model updater of FIG. 3.

FIG. 5 is a block diagram of an example batch model updater of heterogeneous sensors in a training mode to implement the example batch model updater of FIG. 3.

The figures are not to scale. In general, the same reference numbers will be used throughout the drawing(s) and accompanying written description to refer to the same or like parts.

DETAILED DESCRIPTION

Figure 1:
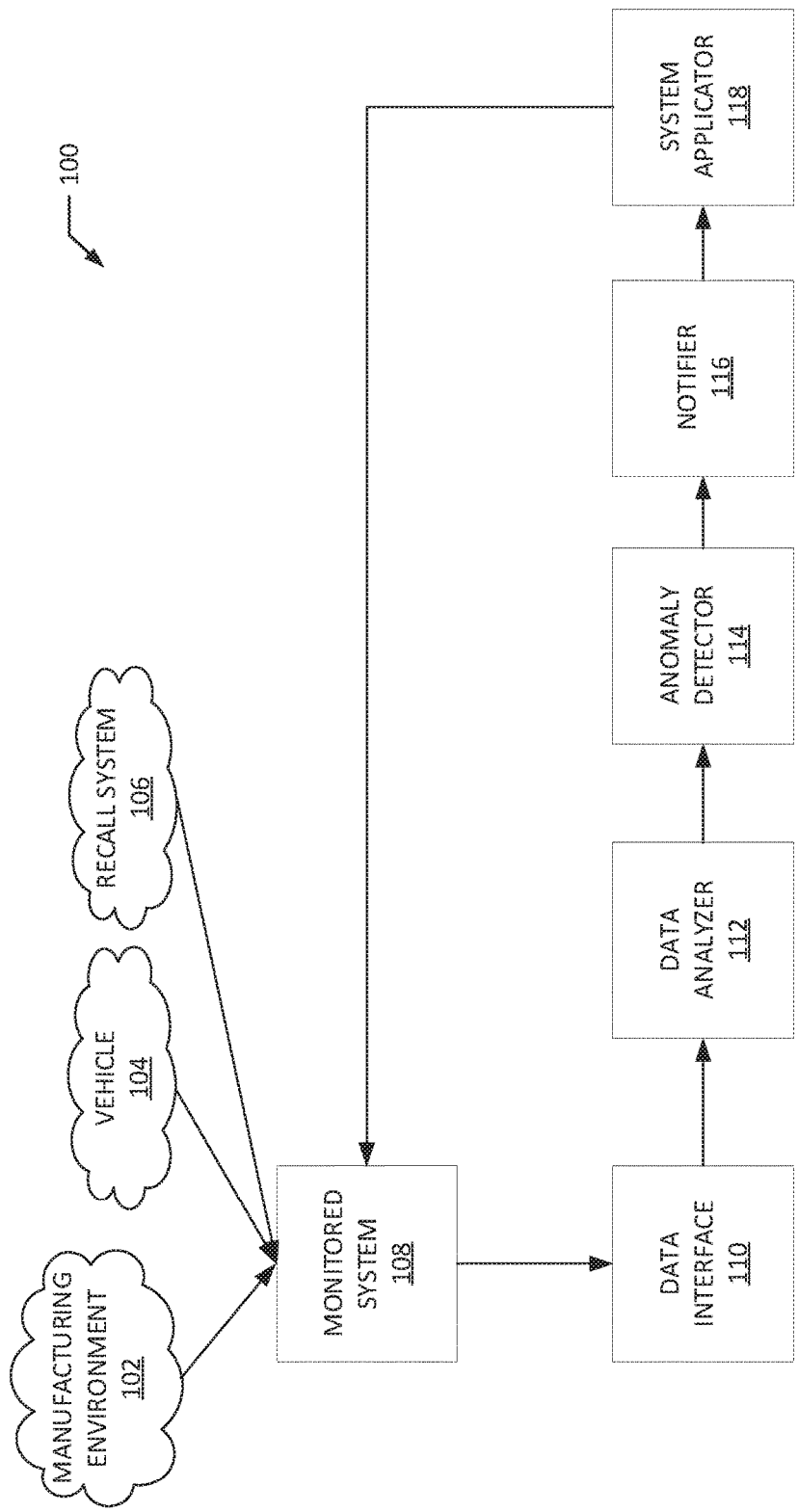
FIG. 1 is a block diagram of an example apparatus to detect an anomaly of a monitored system.

Today, systems of mechanical and electrical type are utilized to perform tasks accurately and speedily. Such systems of mechanical and electrical type are industrious and involve a plurality of sensors, system data extraction methods, monitor technology, etc., to monitor the operation of the system to improve the likelihood that the system operates as intended with substantially few or no errors. Such systems of mechanical and electrical type may include but are not limited to Internet of Things (IoT) sensor deployments, complex vehicle systems such as self-driving cars, auto-piloted planes, drones, and recall network systems that organize and manage proper operations of fleets of vehicles.

As used herein, an anomaly occurs when analyzed data is not commensurate with reference information. Such reference information can be identified as a standard or norm operation and/or can be deemed an expected observation of operation. When an anomaly occurs, the source of the anomaly can be regarded as anomalous, and mitigating action can be taken to substantially reduce or eliminate the effects of the anomalous source.

As used herein, machine learning is a field of artificial intelligence that uses statistical techniques to give monitored systems the ability to "learn" from data, without being explicitly programmed. Machine learning can study algorithms that can learn from and make predictions on data by building a model from sample inputs.

Example Internet of Things (IoT) sensor deployments include a network of physical devices, vehicles, home appliances, and other items in which are embedded electronics, software, sensors, actuators, and connectivity devices which enable connectivity, data collection and data exchange. In IoT sensor deployments, a plurality of sensors monitoring an environment are utilized to provide data about operations of physical devices to allow such physical devices to operate as intended and/or to perform together in a specific way. In some sensor deployments, the network obtains data from its sensors via an edge device to monitor operations of the physical devices in the system. As used herein, an edge device is a device which provides an entry point into the core networks of the IoT sensor deployment. Proper operation of sensors contributes to accuracy of the data collected by the edge device from the sensors in the sensor deployment by the edge device are intact. Anomalies in the collected data from the sensors in the sensor deployment can be indicative of failing sensors. Some examples disclosed herein facilitate the detecting of anomalous data in an IoT sensor deployment based on machine learning that dynamically, over time, learns what data constitutes as anomalous based on data provided by sensors in physical proximity of one another. Other examples disclosed herein facilitate detecting anomalous data in an IoT sensor deployment based on machine learning that dynamically identifies anomalies in sensor data collected from heterogeneous sensors configurations. As used herein, heterogenous sensors are two or more sensors of different types that while available, are considered independently (e.g., separate streams of sensor data are collected from the multiple sensors) to find correlations between their generated data to detect anomalous activity indicative of failure or improper sensor operation.

Some examples disclosed herein facilitate the detecting of an anomaly in one independent system (e.g., a GPS system of a vehicle) and determining a second independent system (e.g., a GPS system of a phone) that could be utilized to operate the first system into a safe state and/or to operate the first system completely. Complex vehicle systems such as self-driving cars, auto-piloted planes, drones, etc., have a plurality of systems for different tasks. For example, a self-driving car includes a steer-by-wire sub-system and a brake-by-wire sub-system that are two independent systems for different tasks (e.g., steering versus de-acceleration), but they control the same mechanical component of the self-driving car. Other examples of independent systems in a complex vehicle system include multiple cellular connections such as cell-phone pairing via Bluetooth, a camera, a lidar sensor (e.g., a detection system that works on the principle of radar, but uses light from a laser), a radar sensor, a global positioning system (GPS), etc. Each of these independent systems performs different tasks but for the same or similar functionally in the vehicle (e.g., a GPS navigates a user and a phone paired via Bluetooth may also navigate a user with its own GPS).

As used herein, a model is a description of a system using mathematical concepts and language. A model is generally composed of relationships and variables, the relationships describing operators (e.g., such as algebraic operators, functions, etc.) and the variables describing monitored system parameters of interest that can be quantified.

Some examples disclosed herein may be used in connection with product recall networks. In a recall network system, certain measures are taken to communicate a factory recall across an entire fleet of vehicles. As used herein, a factory recall is when a manufacturer, that deploys a fleet of vehicles, issues a mandatory request to fix a safety-related defect in the vehicle or update the vehicle to comply with a federal safety standard. In some examples, a manufacturer determines if a factory recall can be avoided by determining an issue or malfunction only one or a few vehicles. Examples disclosed herein use anomaly detection techniques to prevent aggressive or overcorrective product/vehicle recall which can become expensive and can be time wasteful since a massive vehicle recall could recommend maintenance to vehicles in the recall system that do not need such maintenance. Examples disclosed herein facilitate detecting an anomaly of one vehicle and comparing the vehicle data to a plurality of vehicles to determine if the anomaly applies to or is likely to occur for the entire fleet of vehicles.

FIG. 1 illustrates an example apparatus 100 to detect anomalies of a monitored system. Examples systems that may be monitored by, the apparatus 100 include on example manufacturing environment 102, an example vehicle system 104, and/or an example recall system 106. Example of FIGS. 2-6 employ the example apparatus 100 to detect anomalies of the manufacturing environment 102. An example monitored system 108 of FIG. 1 represents a monitored system of the manufacturing environment 102, the vehicle system 104, and/or the recall system 106. For example, in the context of the manufacturing environment 102, the monitored system 108 could be a wheel chair assembly factory. In the context of the vehicle system 104, the monitored system 108 could be an autonomous sport utility vehicle (SUV). In the context of the recall system 106, the monitored system 108 could be a deployed fleet of vehicles. The monitored system 108 is not limited to these examples. In some examples, the apparatus 100 of FIG. 1 could monitor multiple monitored systems 108 concurrently.

The example apparatus 100 of FIG. 1 also includes an example data interface 110, an example data analyzer 112, an example anomaly detector 114, an example notifier 116, and an example system applicator 118. The example apparatus 100 may operate in a training mode and/or a detection mode. For example, when the apparatus 100 operates in a training mode it generates values representative of features in input data and uses such feature values to learn to detect anomalies of different monitored systems. In other examples, when the apparatus 100 operates in a detection mode it generates values representative of features in input data to detect anomalies of different monitored systems 108 and applies a modification to the monitored system 108 when anomalies indicative of unintended operation conditions (e.g., failures) are detected.

The example monitored system 108 represents a type of system as described above for which sensor data is monitored for anomalies. For example, the monitored system 108 provides sensor data for a subsystem of the manufacturing environment 102, the vehicle system 104, and/or the recall system 106 for analysis. Additionally, the monitored system 108 may be provided with any type of sensor deployment system that requires the detection of anomalous data to maintain and/or improve operating efficiency and proper functionality of that system.

The example apparatus 100 is provided with the example data interface 110 to collect input data from the example monitored system 108. For example, the data interface 110 may be provided with sensor data, historical sensor data, planning data, data from a carrier wave, etc., of a monitored system 108 and store the data for future use by the data analyzer 112.

The example apparatus 100 is provided with the example data analyzer 112 to process data into information that is acceptable to provide as an input to the example anomaly detector 114. For example, the data analyzer 112 may receive data from the data interface 110 that corresponds to a plurality of sensors of the example vehicle system 104. The example data analyzer 112 may determine features of the data corresponding to a plurality of sensors, each feature to describe the pertinent information in the data. For example, a feature of data corresponding to a temperature sensor may include a numeric voltage value indicative of a temperature at which a physical device in the example manufacturing environment 102 should operate. In some examples, when the apparatus 100 is operating in a training mode, the data analyzer 112 may receive historical data from sensors to analyze data that is produced when a sensor was known to have been operating in a non-anomalous state (e.g., normal operation). In other examples, the apparatus 100 operating in a detection mode may analyze subsequently collected sensor data in real time using the data analyzer 112 and detect anomalies using the example anomaly detector 114.

The example apparatus 100 is provided with the example anomaly detector 114 to detect an anomaly in the data of a sub-system of the example monitored system 108. The example anomaly detector 114 operating in a training mode learns what data from the monitored system 108 constitutes an anomaly based on multiple iterations of sensor data from the example data interface 110. For example, the data interface 110 provides sensor data from the monitored system 108 to the example data analyzer 112 to determine the features of the data, and the data analyzer 112 provides the determined features to the example anomaly detector 114 so that the anomaly detector 114 can analyze the features and detect an anomaly (e.g., an outlier in the feature, a feature representing incorrect data, etc.). For example, the anomaly detector 114 detects an anomaly based on its training that used historical data as noted above.

The example apparatus 100 is provided with the example notifier 116 to notify the example system applicator 118 when an anomaly has been detected. For example, the notifier 116 may receive a notification from the anomaly detector 114 that an anomaly was detected. The example notifier 116 may generate a report that describes the type of anomaly detected, in which system the anomaly was detected, what error the anomaly may have produced in the system, etc. The example notifier 116 provides the example system applicator 118 with the generated report, and the example system applicator 118 modifies the operation of the monitored system 108 to correct the system 108 based on the detected anomaly.

The example apparatus 100 is provided with the example system applicator 118 to modify operation of the monitored system 108. For example, the system applicator 118 is provided with a description of an anomaly and determines how to modify operation of the monitored system 108 to correct the error detected by the anomaly detector 114. In some examples, the system applicator 118 may be implemented using machine executable instructions that implement pre-defined responses generated for specific anomalous situations.

Figure 2:
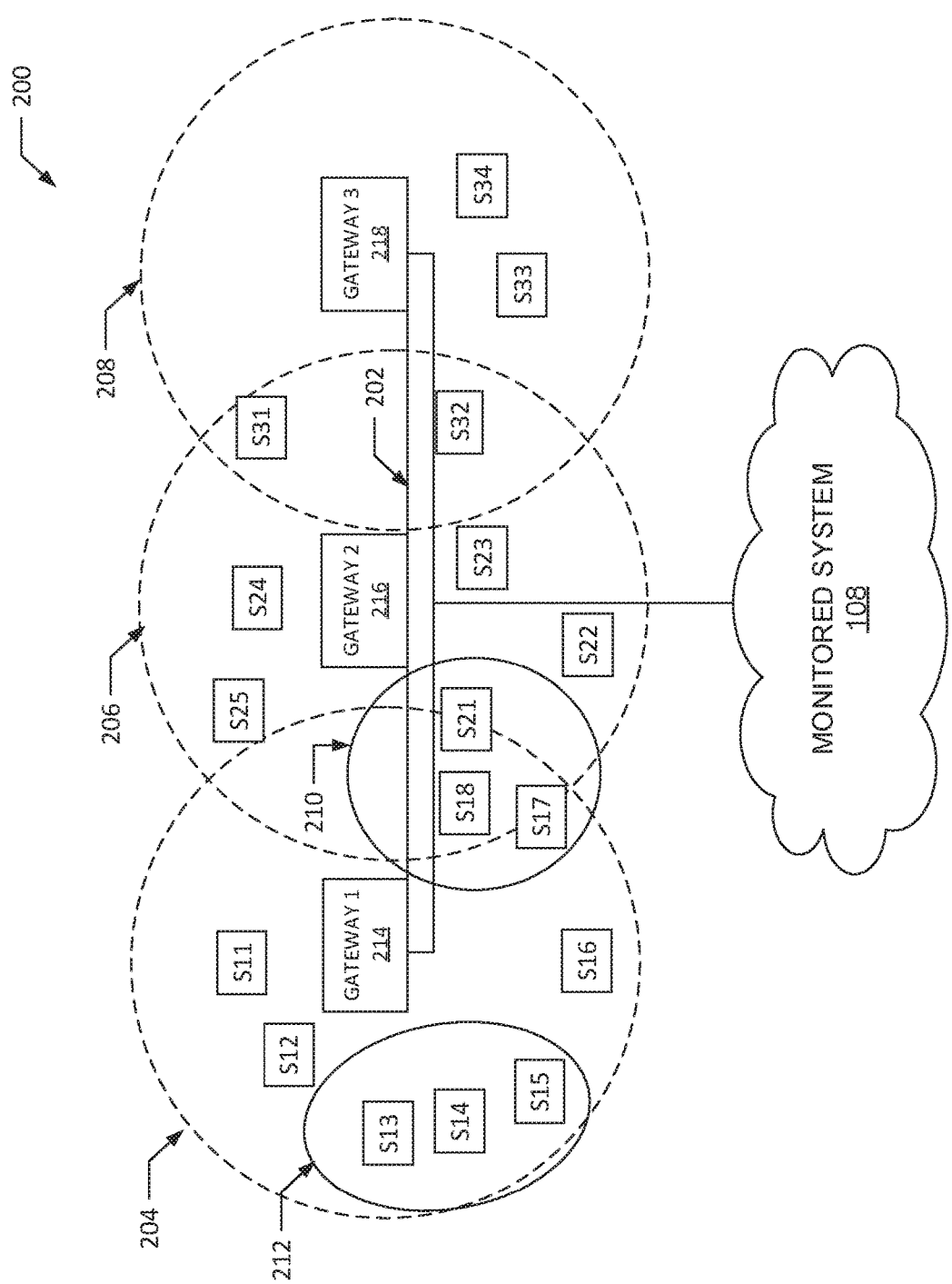
FIG. 2 is a block diagram of an example environment to utilize the example apparatus of FIG. 1 to detect an anomaly in the environment.

FIG. 2 illustrates an example sensor deployment 200 to gather data from the example manufacturing environment 102. The example sensor deployment 200 can be a wireless sensor network (WSN) that is an event based system which relies on a plurality of sensor nodes that continuously monitor and/or obtain data of physical phenomenon (e.g., electricity, heat, radiation, motion, etc.). The example sensor deployment 200 includes an edge device 202 in communication with an example first gateway 214, an example second gateway 216, and an example third gateway 218. The example boundaries 204, 206, and 208 include sensors to monitor physical devices in the manufacturing environment 102.

In illustrated example of FIG. 2, the sensor deployment 200 is provided with the example edge device 202 to provide an entry point into networks of different locations of a manufacturing environment 102. As used herein, an edge device 202 is a type of networking device that connects an internal local area network (LAN) with an external wide area network (WAN) or the Internet. It also provides interconnectivity and traffic translation (e.g., the flow of data from the sensors) between different networks on the entering edge devices or the network boundaries. For example, the edge device 202 can be a router, routing switches, integrated access devices (IADs), multiplexers, etc. The edge device 202 of the manufacturing environment 102 can connect sensors of multiple types and in multiple locations, to the apparatus 100 of FIG. 1 to detect anomalies.

In the illustrated example of FIG. 2, the sensor deployment 200 is illustrated with an example first boundary 204, an example second boundary 206, and an example third boundary 208 to illustrate maximum distance ranges that a gateway 214, 216, 218 can communicate with sensors. For example, the first boundary 204 includes sensors S11, S12, S13, S14, S15, S16, S17, S18 that are within the first boundary 204 and are managed by the first gateway 214. In some examples, sensors can be located in more than one boundary. For example, sensor S17, sensor S18, and sensor S21 are in a first overlap 210, the first overlap 210 indicating a crossover between the first boundary 204 and the second boundary 206. If a sensor is located in more than one boundary (e.g., an overlap), the sensor may be managed by more than one gateway. For example, the first gateway 214 manages the sensors located in the first boundary 204, and the second gateway 216 manages the sensors located in the second boundary 206. The sensors S17, S18, S21 located in the first overlap 210 can be managed by either gateway 214 and/or gateway 216.

In the illustrated example of FIG. 2, the sensor deployment 200 is provided with the first gateway 214, the second gateway 216, and the third gateway 218 to communicate between sensor nodes in their respective boundaries and the edge device 202. For example, the first gateway 214 can manage the sensor nodes (e.g., provide instructions of operation, retrieve output data, provide power or remove power, etc.) and collect information and measurements over a wireless topology and relay or transmit the information via the edge device 202 to the apparatus 100.

In some examples of FIG. 2, the first gateway 214 determines the sensors of the same type that are in proximity to each other (e.g., within less than a threshold distance) and collects the sensor data from the proximately located sensors to provide to the data interface 110 of FIG. 1. In examples disclosed herein, a threshold distance that defines when two or more sensors are proximately located to one another can be determined by a person or a machine (e.g., based on a machine learning algorithm). The threshold distance can be selected to be a distance suitable to correlating features in sensor data from one sensor in a relevant way to sensor data of another sensor. That is, if two sensors are spaced too far apart, features in sensor data from one sensor will not be relevant to observations of the other sensor because the significant distance between the two sensors results in the sensors observing substantially different aspects of an environment. In examples disclosed herein, the gateways 214, 216, and 218 can use wireless (e.g., Wi-Fi) signal strengths of communications with the sensors, location identifiers, that were set at the time of sensor deployment, and/or any other suitable technique to determine locations of sensors and proximities to one another. For example, the first gateway 214 can determine that sensor S13, sensor S14, and sensor S15 are temperature sensors that are in sufficient proximity to one another to measure the temperature of the same physical device in the manufacturing environment 102. The first gateway 214 provides the information collected by the sensors S13, S14, and S15 to the data interface 110 to detect an anomaly based on sensors that are in proximity to one another. Additionally, the second gateway 216 and the third gateway 218 can determine sensors of the same type in proximity to one another and collect sensor data from them to provide to the example data interface 110.

In some examples of FIG. 2, the first gateway 214 determines the sensors of different types that form hybrid sensor groups of hybrid sensor sets. A hybrid group or set includes at least two sensors in which a first one of the sensors is of a first sensor type (e.g., a mechanical float-based fluid level sensor) and a second one of the sensors is a second sensor type (e.g., a camera) different from the first sensor type. Such a hybrid sensor group can be located in the first boundary 204, the first overlap 210, or the second boundary 206, and the first gateway 214 collects sensor data therefrom and provides the sensor data to the data interface 110 of FIG. 1. For example, sensor S17, sensor S18, and sensor S21 are located in the first overlap 210 as illustrated in the FIG. 2. Sensor S17 and sensor S18 may be temperature sensors and sensor S21 may be an infrared sensor implemented using a camera. In such example, the three sensors to measure the temperature of a light fixture in the manufacturing environment 102. The first gateway 214 can collect sensor data from the three sensors S17, S18, and S21 and provide the sensor data to the data interface 110 for analysis and anomaly detection.

Figure 3:
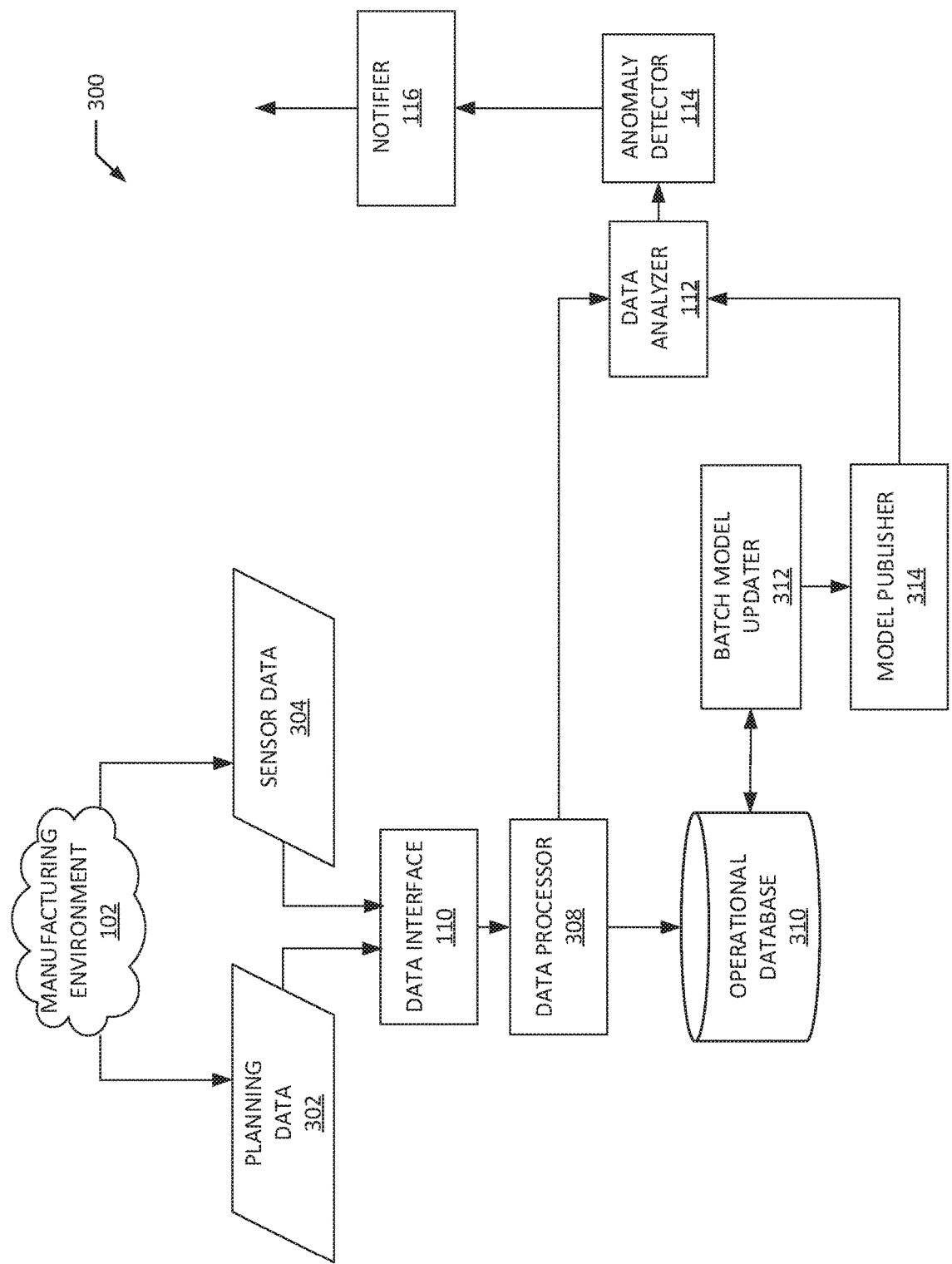
FIG. 3 is a block diagram to of an example machine learning apparatus that may be implemented in connection with the example apparatus of FIG. 1 to process sensor data of the environment.

FIG. 3 illustrates an example machine learning apparatus 300 to process sensor data of the example manufacturing environment 102. The example machine learning apparatus 300 is provided with the example data interface 110, an example data processor 308, an example operational database 310, an example batch model updater 312, an example model publisher 314, the example data analyzer 112, the example notifier 116, and an example classifier 316.

The illustrated example of FIG. 3 is provided with the data interface 110 to collect input data from the manufacturing environment 102. For example, the data interface 110 may be provided with planning data 302, sensor data 304, etc. As used herein, planning data 302 specifies control information about operational technology (OT) in the manufacturing environment 102 that can be used to detect changes through monitoring of components of the manufacturing environment 102 and control of physical devices, processes and events in the manufacturing environment 102 in response to the detected changes. As used herein, OT is the hardware and/or software dedicated to detecting or causing changes in physical processes through direct monitoring and/or control of physical devices.

The example apparatus 300 of FIG. 3 is provided with the data processor 308 to transform the planning data 302 and/or the sensor data 304 collected by the data interface 110 into an information format useful for analysis by the data analyzer 112. For example, the data processor 308 can process sensor data 304 to generate transformed sensor data that is non-corrupt, accurate, and/or refined. In some examples, the data processor 308 performs extraction, transformation, and loading (ETL) to obtain useful data from the planning data 302 and/or the sensor data 304 provided by the data interface 110 and provide it to the operational database 310. As used herein, extraction is the process of reading data from the data interface 110, transformation is the process of converting the extracted data from its previous form into a form that is suitable for storing in the operational database 310, and loading is the process of writing the data into the operational database 310.

The example apparatus 300 of FIG. 3 is provided with the operational database 310 to store data (e.g., transformed version(s) of the planning data 302 and/or the sensor data 304) received from the data processor 308. The operational database 310 also stores models received from the batch model updater 312, which is described in more detail below. For example, the operational database 310 may receive a plurality of models that are updated over time depending on the data received from the manufacturing environment 102.

The example apparatus 300 of FIG. 3 is provided with the data analyzer 112 to perform stream analytics on the data (e.g., transformed version(s) of the planning data 302 and/or the sensor data 304) received from the data processor 308 to predict an output of an operation of the manufacturing environment 102. As used herein, stream analytics is the processing of high volumes of data streaming from the sensors, therefore providing real-time analysis on the sensors. The example data analyzer 112 can utilize a convolutional neural network (CNN), a one-class support vector machine, a Bayesian network, or a density-based technique to predict an output of the sensors of an example manufacturing environment. In some examples, the data analyzer 112 is periodically updated by the model publisher 314. For example, the model publisher 314 can provide a new set of filters or model that has been updated according to the data, historical or new, in the batch model updater 312. As used herein, filters are used to extract pertinent features of a given set of data by removing missing data values or replacing missing data values with placeholders, setting a range of predetermined data values and keeping only the data values within that range, etc. The filters can be predetermined and/or learned over time. The example data analyzer 112 is further described below in conjunction with FIG. 6.

The example apparatus 300 of FIG. 3 is provided with the example anomaly detector 114 to detect an anomaly in the data (e.g., the sensor data 304) of the example manufacturing environment 102. In some examples, the anomaly detector 114 of the manufacturing environment 102 utilizes a statistical-based algorithm to determine whether to raise a flag or not to raise a flag depending on the prediction value provided by the example data analyzer 112.

The example apparatus 300 of FIG. 3 is provided with the example notifier 116 to notify the example system applicator 118 of FIG. 1 if an anomaly has been detected. In some examples, the notifier 116 is a notification service that is integrated with OT which delivers anomaly alerts through frameworks (e.g., mobile push notifications, logs, emails, etc.) selected for the manufacturing environment 102. In other examples, the notifier 116 can receive data from the data analyzer 112, the model publisher 314, or any other processor, hardware, software, and/or memory that could provide data to the notifier 116.

The example notifier 116 can also be utilized to trigger a recalibration of a network. For example, if the anomaly detector 114 determines that outliers are detected (e.g., data that is considered not normal and/or deviated from other sensor data at a specified time and therefore constitutes as anomalous), it may send a trigger (e.g., a request, a notification, etc.) to the example notifier 116 to request the system applicator 118 to recalibrate the data analyzer 112 using the input data the example data analyzer 112 received. For example, if the anomaly detector 114 determines that the data provided by the temperature sensor S14 at a first time t=1 had a higher value (e.g., a higher temperature) than the data provided by the temperature sensor S15 at the same time t=1, then the anomaly detector 114 would specify that sensor S14 is malfunctioning and is therefore anomalous. Therefore, the example anomaly detector 114 may send a message or request to the example notifier 116 to request the system applicator 118 to recalibrate or generate a new model using the temperature sensor S14 data and the temperature sensor S15 data from the time t=1. Generating a new model based on new input data increases the accuracy of detection in the apparatus 300 of FIG. 3 by continuously providing up-to-date data for use by an example feature extractor 402 and an example model trainer 404 of the batch model updater 312 described below.

The example apparatus 300 of FIG. 3 is provided with the batch model updater 312 to generate a model to provide to the anomaly detector 114. For example, the batch model updater 312 retrieves historical sensor data from the operational database 310 and generates a feature vector(s) corresponding to the numeric or symbolic characteristics of a set of data (e.g., the historical sensor data). The example batch model updater 312 generates an inference (e.g., a conclusion, a classification, a deduction, etc.) of how a sensor, a system, etc. in the manufacturing environment 102 is operating. For example, the inference can determine if a sensor is performing in a normal manner or an anomalous manner.

In this example, the inference may not predict the correct operation of the sensor, system, etc. in the manufacturing environment 102 the first time it is generated. However, the example batch model updater 312 periodically generates new feature vectors and inferences in order to generate precise models that are useful to more accurately confirm subsequent detections of anomalies in the sensor data 304. The example batch model updater 312 triggers a request for publishing from the example model publisher 314. The batch model updater 312 is further described below in connection with FIGS. 4 and 5.

The example apparatus 300 of FIG. 3 is provided with the example model publisher 314 to publish the model generated by the batch model updater 312 and provide it to the example data analyzer 112. For example, the model publisher 314 receives a model from the batch model updater 312 and transforms it into a consumable format for publishing. As used herein, consumable format is defined as a model that is intended to be used and then replaced (e.g., by an updated model). The model publisher 314 transforms the model into a consumable format to constantly update the data analyzer 112 during the training and detecting phase. In some examples, the model publisher 314 determines if the received model is acceptable to publish. For example, the model publisher 314 may receive a new model that corresponds to proximately located temperature sensors, but the model publisher 314 may have previously been provided with a model corresponding to proximately located temperature sensors for which that previous model has not been consumed (e.g., used) by the data analyzer 112. In this example, the model publisher 314 may determine that the new received model cannot be published (e.g., until the previous model is consumed). Other examples in which a model is not acceptable to publish occur when the model publisher 314 is unable to transform the model into a consumable format, and therefore cannot provide the model to the anomaly detector 114.

FIGS. 4 and 5 illustrate example block diagrams of different ways to implement the batch model updater 312 to generate a model and provide the model to the example anomaly detector 114. FIG. 4 illustrates an example batch model updater apparatus 400 that may be used to implement the batch model updater 312 of FIG. 3 to detect an anomaly based on data from proximately located sensors. The example batch model updater apparatus 400 includes an example feature extractor 402, an example model trainer 404, an example model updater 406, and an example model generator 408. FIG. 5 illustrates an example batch model updater apparatus 500 that may be used to implement the batch model updater 312 of FIG. 3 to detect an anomaly based on sensor data (e.g., the sensor data 304 of FIG. 3) from heterogeneous sensors. The example batch model updater apparatus 500 includes the example feature extractor 402, an example sensor data aggregator 502, the example model trainer 404, the example model updater 406, and the example model generator 408.

Turning to FIG. 4, the example batch model updater apparatus 400 is provided with the feature extractor 402 to generate a feature vector based on a query for retrieving historical data from the operational database 310. The example feature extractor 402 generates or builds derived values of feature vectors (e.g., representative of features in input sensor data 304) that are to be informative and non-redundant to facilitate the training phase of the batch model updater 312. As used herein, a feature vector is an n-dimensional array (e.g., a vector) of features that represent some physical device, object, measurement parameter, etc. For example, a feature could be a parameter measurement of the monitored system 108 such as temperature, pressure, humidity, visual characteristics, light level, proximity distance, speed, item counts, etc. The example feature extractor 402 reduces raw input data (e.g., the sensor data 304 from the manufacturing environment 102) into more manageable groups (e.g., features) for processing, while describing the original input sensor data with sufficient completeness and accuracy. In the illustrated example of FIG. 4, the feature extractor 402 identifies features in sensor data that correspond to their location and similarity. The feature data provided by the feature extractor 402 facilitates the model trainer 404 in training a model to detect an anomaly in proximately located sensors. For example, in the sensor deployment 200 of FIG. 2, sensor S14 is within a proximity threshold distance to sensor S15, thus, sensors S14 and S15 are proximately located to one another. In such examples, the feature extractor 402 extracts temperature value vectors for the two sensors and provides the vectors to the model trainer 404. In some examples, the feature extractor 402 may extract a plurality of features corresponding to large sets of input data, it may extract fewer features corresponding to a smaller set of input data, etc. After the example feature extractor 402 extracts features of the sensor data, it outputs a feature vector.

The example batch model updater apparatus 400 of FIG. 4 is provided with the model trainer 404 to train a model based on the output feature vector of the feature extractor 402. The model trainer 404 operates in a training mode where it receives a plurality of historical data, generates a prediction, and outputs a model based on that prediction. For the example model trainer 404 to generate a model, it receives feature vectors corresponding to target sensor data. For example, during a training mode, conformations are made that the sensors of the manufacturing environment 102 are operating in the way they were intended to (e.g., temperature sensors detecting accurate and/or precise temperatures of a system) so that the data they provide to the data interface 110 is suitable for learning. For example, the model trainer 404 receives a feature vector indicative of the features of intended sensor data and identifies a pattern in the intended sensor data that maps the intended data attributes to the target (e.g., the operation and/or answer that the model wants to predict) and outputs a model that captures these patterns. The example model trainer 404 provides the output model to the example data analyzer 112 to assist in generating predictions on new sensor data in which the intended operation is unknown.

An example manner of implementing the model trainer 404 for proximately located sensors is to utilize the model trainer 404 to identify spatial-temporal correlations between sensors in the example sensor deployment 200 of FIG. 2. As used herein, a spatial correlation is defined as the spatially proximal sensor observations in a wireless sensor network (WSN) due to the spatially dense WSN (e.g., the sensors located in the same space as each other). As used herein, temporal correlation is defined as the nature of the physical phenomenon between each observation of a sensor in the example sensor deployment 200 (e.g., the sensors observing the same type of physical phenomenon). In some examples, identifying the spatial-temporal correlation between sensors in the example sensor deployment 200 can reduce the data traffic generated in the example gateways 214, 216, and 218 by collecting data of two sensors spatially and temporally correlated rather than collecting the data of the plurality of sensors associated with one of the example gateways 214, 216, 218 to detect an anomaly.

The example batch model updater apparatus 400 of FIG. 4 is provided with the example model updater 406 to flag a model received from the model trainer as new and/or updated. For example, the model updater 406 can receive a model from the model trainer 404 that provides a prediction algorithm to detect an anomaly corresponding to temperature sensors in proximity to each other. The model updater 406 determines that a model of this type is new and, therefore, tags it as new. Alternatively, the model updater 406 determines that a model of this type has been generated previously and, therefore, will flag the model most recently generated as updated. The example model updater 406 provides the new and/or updated model to the model generator 408.

The example batch model updater 400 of FIG. 4 is provided with the example model generator 408 to generate a model for publishing. For example, the model generator 408 may receive a notification from the model updater 406 that a new and/or updated model has been trained and the model generator 408 may create a file in which the model is published so that the model can be saved and/or stored as the file. In some examples, the model generator 408 provides a notification to the model publisher 314 that a model is ready to be transformed and published.

Turning to FIG. 5, the example batch model updater apparatus 500 is used to detect an anomaly of a manufacturing environment 102 based on sensor data 304 from heterogenous sensors of the example sensor deployment 200 FIG. 2. The example batch model updater apparatus 500 generates a model that determines a grouping of heterogeneous sensors that produce redundant data. For example, the batch model updater apparatus 500 utilizes a transfer learning method (e.g., a technique in which a model is trained on one type of data and re-purposed on a second type of data) to use data from a secondary sensor (e.g., a temperature sensor) and data from a primary sensor (e.g., thermal cameras) and trains a model using the secondary sensor data to predict a parameter measurement (e.g., temperature data) corresponding to the primary sensor. For example, a thermal imaging camera can generate redundant data of a temperature sensor by applying a temperature analysis (e.g., determining the temperature of the system captured in the image) on the images and comparing them to temperature readings generated by the temperature sensors. Additionally, the images from the camera can be used to identify any physical damage to the temperature sensor or possible removal of the sensor from the expected location. The example batch model updater apparatus 500 can be deemed as advantageous in sensor deployments where visual and/or physical inspection is not possible or readily available.

The example batch model updater 312 of FIG. 5 is provided with the feature extractor 402 to generate a feature vector based on a query for retrieving historical data from the operational database 310. The feature extractor 402 of FIG. 5 operates in a similar manner as the feature extractor 402 of FIG. 4 described in above examples. However, the feature vectors generated by the example feature extractor 402 of FIG. 5 represent features of different types of historical sensor data. For example, the feature extractor 402 queries the operational database 310 to retrieve historical data from sensors of heterogenous (e.g., different) types and produces output feature vectors corresponding to those heterogeneous sensors. The example feature extractor 402 may generate a feature vector of a secondary sensor (e.g., a temperature sensor) used to obtain data of the same physical device (e.g., a holding vessel) as a primary sensor (e.g., a thermal imaging camera). In some examples, the feature extractor 402 may also generate a feature vector of a primary sensor. In other examples, the sensor data 304 may be transformed into corresponding measurement units (e.g., degrees, seconds, voltage, etc.) before it is provided to the feature extractor 402. For example, the data interface 110, the data processor 308, or the operational database 310 may convert the sensor data 304 into measurement unit values.

The example batch model updater 500 of FIG. 5 is provided with the sensor data aggregator 502 to aggregate diverse sensor data into one or more feature vectors. For example, the feature extractor 402 of FIG. 5 can generate a plurality of features corresponding to a plurality of different sensor types and provide the features to the sensor data aggregator 502. The example sensor data aggregator 502 may determine the features that correspond to a first redundant data type and aggregate them as a first feature vector and determine features that correspond to a second redundant data type and aggregate them as a second feature vector. The example sensor data aggregator 502 may generate a plurality of feature vectors corresponding to a plurality of sensor data types. An example of such aggregation of sensor data into one or more features includes a scenario in which a thermal camera provides its thermal camera sensor data of an environment and a temperature sensor (e.g., a non-camera temperature sensor) provides its temperature sensor data of the same environment. Although the two sensor data sets are of different types from different types of sensors, they include a common feature (e.g., a temperature measurement). As such, examples disclosed herein aggregate the diverse sensor data into a same feature to represent the temperature measurement reflected in the diverse sensor data. Thus, the sensor data aggregator 502 is to combine common features (e.g., overlapping features across multiple sensors) of the heterogenous sensor data with diverse features (e.g., non-overlapping features across the multiple sensors). The number of aggerated features would be reduced compared to the total number of features from different sensors. The reduced number of features facilitates the generating of an efficient unified model for diverse sensors.

The example batch model updater 500 of FIG. 5 is provided with the model trainer 404 to train a model based on the feature vectors provided by the sensor data aggregator 502. In some examples of FIG. 5, the model trainer 404 may not receive a feature vector from the sensor data aggregator 502 but instead receive a feature vector from the feature extractor 402. The model trainer 404 operates in a similar manner as described in connection with FIG. 4.

An example method to implement the model trainer 404 for heterogeneous sensors is to utilize the model trainer 404 to train a model based on features of a first sensor of a first type to predict the sensor data from a second sensor of a second type. For example, the model trainer 404 can train a model to determine the output of the sensor S21 of FIG. 2 in the sensor deployment 200, the sensor S21 representing a camera coupled to a vehicle that transports goods along a transportation track (e.g., a path along which a vehicle moves) in a factory. The trained model may determine, by analyzing the features of an image provided by the camera, that an object is located in the path of travel of the vehicle. The model trainer 404 provides the model to be published and stored. The example model trainer 404 may also train a model to determine the output of features of sensors S17 and S18 of the example sensor deployment 200 which are infrared (IR) sensors located on the transportation track to detect the obstruction in the track. The example trained model may determine, by analyzing the features, that when an IR sensor outputs a logic 1 (e.g., a digital value that represents a voltage greater than 0), there is an obstruction on the track, and when the IR sensor outputs a logic 0 (e.g., a digital value representing a voltage of zero or very small value) there is not an obstruction on the path. The example model trainer 404 may then utilize the model published for the sensor S21 to validate the prediction of an obstruction that was determined by the IR-sensor-trained model. By utilizing this technique of data transfer method, the example model trainer 404 is more likely to provide the example anomaly detector 114 with an accurate and precise model of a future prediction of sensor data of a first sensor type to predict a deviation of a correct output operation of sensor data of a second type in the example sensor deployment 200. For example, the anomaly detector 114 may set a threshold value corresponding to a deviation range between a correct output operation and a malfunctioning operation (e.g., intended sensor data and non-intended sensor data). The example anomaly detector 114 can detect an anomaly based on if the threshold is surpassed.

The example batch model updater 500 of FIG. 5 is provided with the model updater 406 to flag a model received from the model trainer 404 as new and/or updated and the model generator 408 to generate a model for publishing. The example model trainer 404 and the example model generator 408 are described above in conjunction with FIG. 4.

While example manners of implementing the apparatus 100 and 300 are illustrated in FIGS. 1 and 3, and example manners of implementing the batch model updater 312 of FIG. 3 are illustrated in FIGS. 4 and 5. However, one or more of the elements, processes and/or devices illustrated in FIGS. 1, 3, 4 and 5 may be combined, divided, re-arranged, omitted, eliminated and/or implemented in any other way. Further, the example data interface 110, the example data analyzer 112, the example anomaly detector 114, the example notifier 116, the example system applicator 118, the example data processor 308, the example batch model updater 312, the example model publisher 314, the example feature extractor 402, the example model trainer 404, the example model updater 406, the example model generator 408, the example sensor data aggregator 502, and/or, more generally, the example apparatus 100, the example apparatus 300, and/or the batch model updater 312 of FIGS. 1 and 3 may be implemented by hardware, software, firmware and/ or any combination of hardware, software and/or firmware. Thus, for example, any of the example data interface 110, the example data analyzer 112, the example anomaly detector 114, the example notifier 116, the example system applicator 118, the example data processor 308, the example batch model updater 312, the example model publisher 314, the example feature extractor 402, the example model trainer 404, the example model updater 406, the example model generator 408, the example sensor data aggregator 502, and/or, more generally, the example apparatus 100, the example apparatus 300, and/or the example batch model updater 312 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device (s) (FPLD(s)). When reading any of the apparatus or system claims of this patent to cover a purely software and/or firmware implementation, at least one of the example data interface 110, the example data analyzer 112, the example anomaly detector 114, the example notifier 116, the example system applicator 118, the example data processor 308, the example batch model updater 312, the example model publisher 314, the example feature extractor 402, the example model trainer 404, the example model updater 406, the example model generator 408, and/or the example sensor data aggregator 502, is/are hereby expressly defined to include a non-transitory computer readable storage device or storage disk such as a memory, a digital versatile disk (DVD), a compact disk (CD), a Blu-ray disk, etc. including the software and/or firmware. Further still, the example apparatus 100, the example apparatus 300, and/or the example batch model updater 312 of FIG. 3 may include one or more elements, processes and/or devices in addition to, or instead of, those illustrated in FIGS. 1, 3, 4 and 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
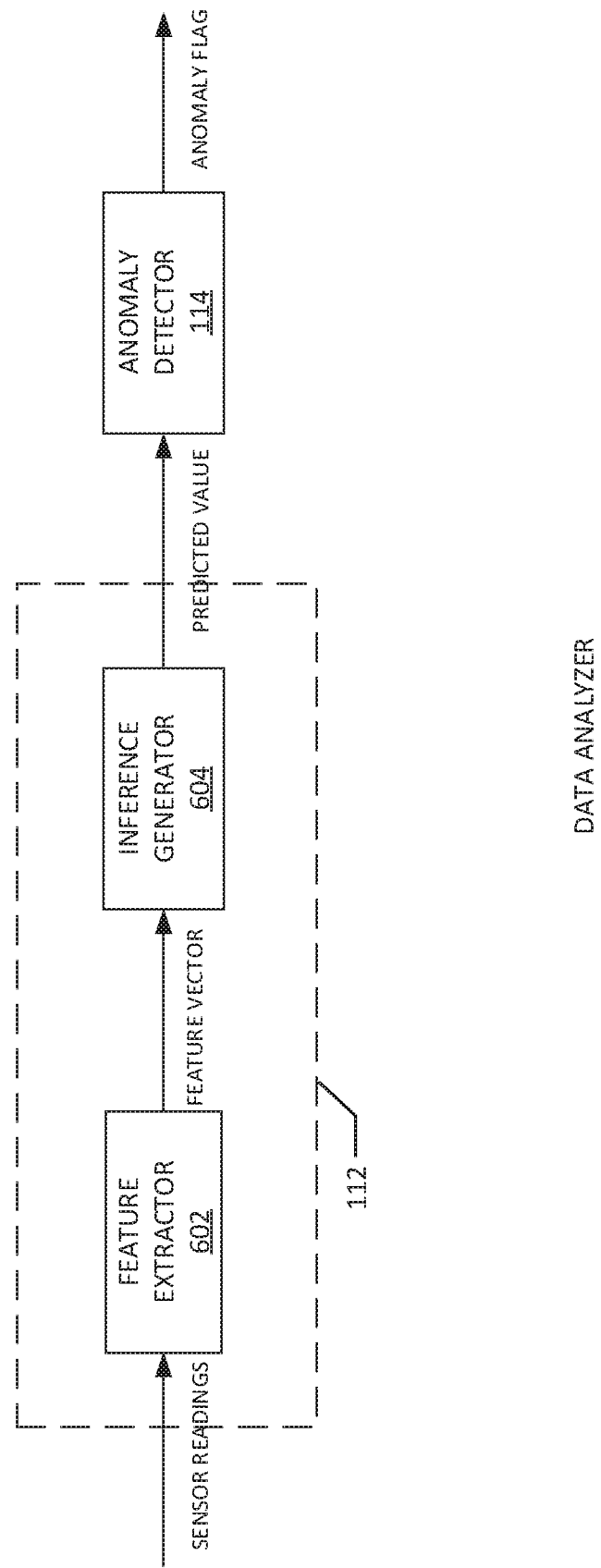
FIG. 6 is a block diagram of the example data analyzer of FIGS. 1 and 2 in a detection mode to detect an anomaly of a monitored environment.

FIG. 6 illustrates an example manner to implement the data analyzer 112 of FIG. 1. The illustrated example of FIG. 6 operates in a detection mode to generate a prediction of sensor data in real time (e.g., the time at which the sensor is operating). The example data analyzer 112 of FIG. 6 includes an example feature extractor 602 and an example inference generator 604. The example inference generator 604 is in communication with the example anomaly detector 114 to facilitate detecting anomalous data of the example sensor deployment 200 of FIG. 2.

The illustrated example of FIG. 6 is provided with the feature extractor 602 to extract features of raw sensor data and generate a feature vector to provide to the inference generator 604. For example, the feature extractor 602 operates in a manner similar to the feature extractor 402 of FIGS. 4 and 5. However, in some examples the feature extractor 602 does not extract features of historical data. The example feature extractor 602 extracts data of sensors that may be anomalous. For example, the feature extractor 602 may receive sensor readings from a first sensor of a first type and determine the first sensor readings are possibly anomalous and the feature extractor 602 starts to extract features from a second sensor (of a first type or second type) to verify the first sensor data is anomalous. In some examples, the feature vector generated by the feature extractor 602 may represent data that is skewed, incorrect, anomalous, etc. compared to data that a sensor is intended to output.

The example data analyzer 112 of FIG. 6 is provided with the inference generator 604 to generate a prediction based on a feature vector provided by the example feature extractor 602. For example, the inference generator 604 may generate a probability value indicative of the likelihood that the raw data received is anomalous by utilizing a model that is trained, generated, and published by the example batch model updater 312 and the example batch model publisher 314 of FIG. 3. For example, the data interface 110 may retrieve temperature data of sensor S14 and temperature data of sensor S15, and the inference generator 604 utilizes the trained model based on the temperature data of the two sensors S14, S15 to determine spatial-temporal correlations of the two sensors S14, S15 to output a probability value indicative of a likelihood that one of the sensors S14, S15 is producing incorrect temperature readings. The example inference generator 604 is periodically updated by the example batch model updater 312. The prediction values produced by the example inference generator 604 are provided to the example anomaly detector 114.

The example data analyzer 112 of FIG. 6 is provided with the example anomaly detector 114 to determine if an anomaly was detected by the inference generator 604. For example, the anomaly detector 114 receives from the inference generator 604 probability values indicative of likelihoods that sensor(s) in the sensor deployment 200 are malfunctioning, being tampered with, etc. The example anomaly detector 114 generates a flag (e.g., sets a bit to 1, clears a bit to 0, stores an "anomaly detected" value, etc.) if it determines that the probability values are sufficiently indicative of anomalous operation. The anomaly detector 114 provides the flag to the example notifier 116 of FIG. 1 to notify the example system applicator 118 that the sensors under analysis need to be modified to correct and/or prevent the detected anomaly.

While an example manner of implementing the data analyzer 112 of FIG. 3 is illustrated in FIG. 6, one or more of the elements, processes and/or devices illustrated in FIG. 6 may be combined, divided, re-arranged, omitted, eliminated and/or implemented in any other way. Further, the example feature extractor 602, the example inference generator 604 and/or, more generally, the example data analyzer 112 of FIG. 3 may be implemented by hardware, software, firmware and/or any combination of hardware, software and/or firmware. Thus, for example, any of the example feature extractor 602, the example inference generator 604 and/or, more generally, the example data analyzer 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example feature extractor 602 and/or the example inference generator 604 is/are hereby expressly defined to include a non-transitory computer readable storage device or storage disk such as a memory, a digital versatile disk (DVD), a compact disk (CD), a Blu-ray disk, etc. including the software and/or firmware. Further still, the example data analyzer 112 of FIG. 3 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware-implemented state machines, and/or any combination thereof for implementing the apparatus 100 of FIG. 1 are shown in FIGS. 7A, 7B, 8, 9A, and 9B. The machine readable instructions may be one or more executable programs or portions of executable programs for execution by a computer processor such as the processor 1212 shown in the example processor platform 1200 discussed below in connection with FIG. 12. The program(s) may be embodied in software stored on a non-transitory computer readable storage medium such as a CD-ROM, a floppy disk, a hard drive, a DVD, a Blu-ray disk, or a memory associated with the processor 1012, but the entirety of the program(s) and/or parts thereof could alternatively be executed by a device other than the processor 1212 and/or embodied in firmware or dedicated hardware. Further, although the example program(s) are described with reference to the flowcharts illustrated in FIGS. 7A, 7B, 8, 9A, and 9B, many other methods of implementing the example apparatus 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 7A, 7B, 8, 9A, and 9B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

As mentioned above, the example processes of FIGS. 7A, 7B, 8, 9A, and 9B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 7A:
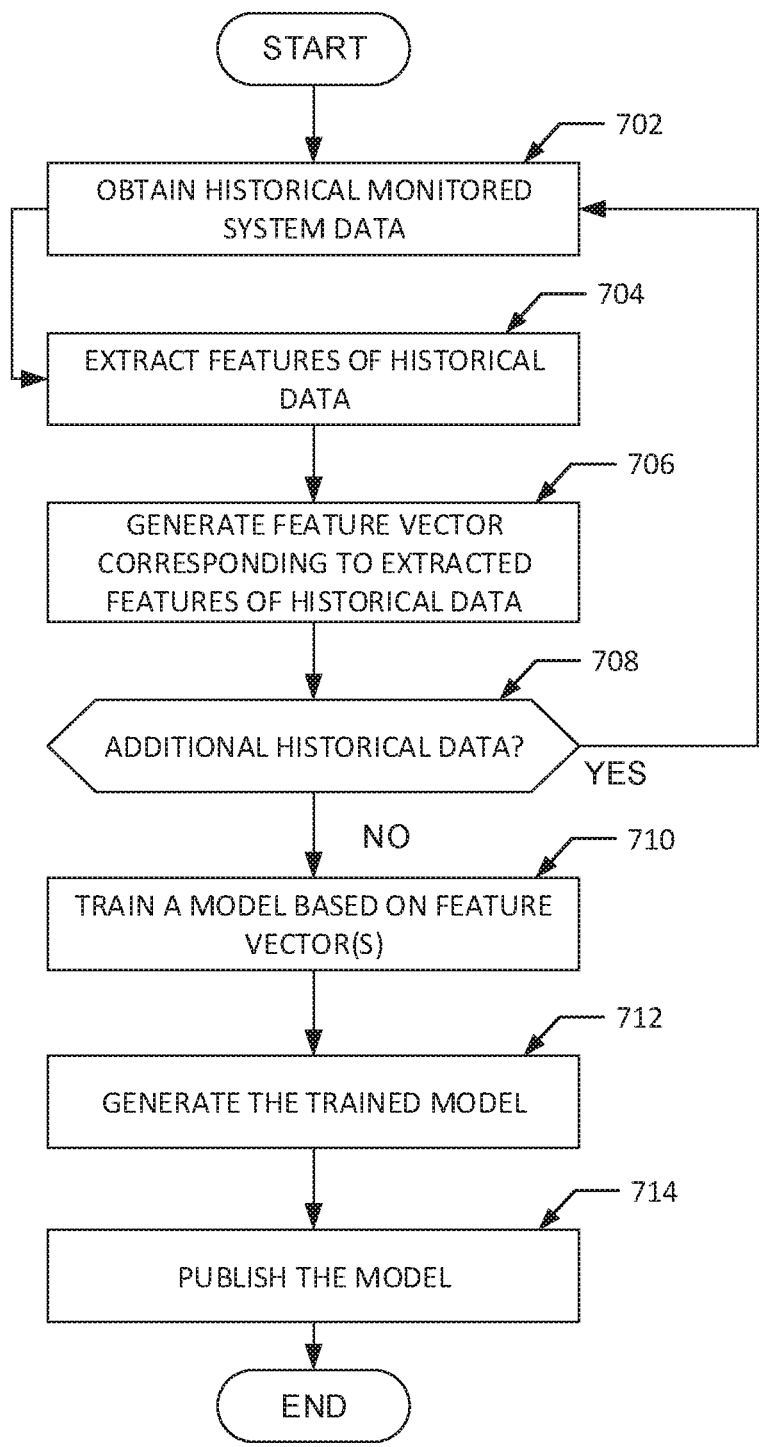
FIGS. 7A and 7B depict a flowchart representative of machine readable instructions which may be executed to implement the example apparatus of FIGS. 1 and 3 to detect an anomaly of a monitored system.
Figure 7B:
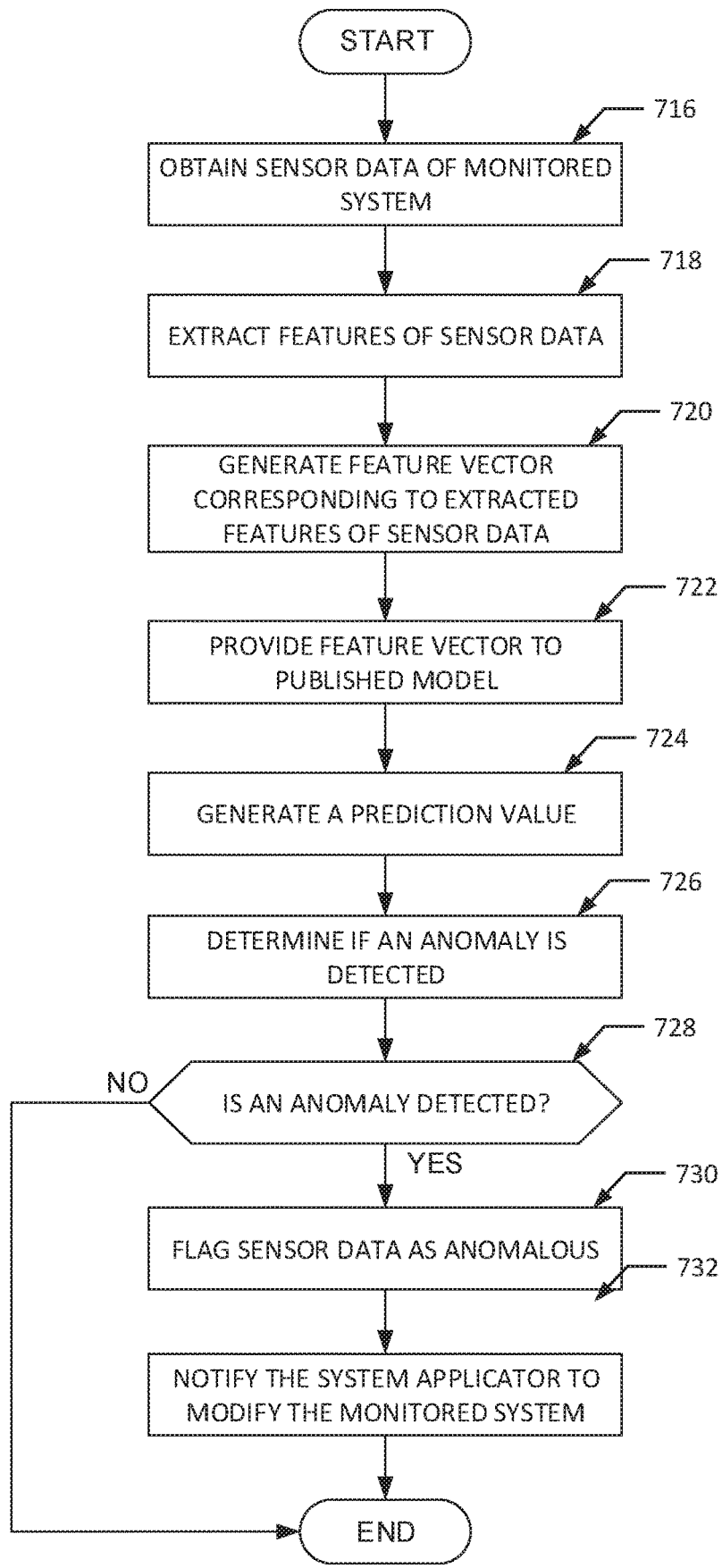

Turning now to FIGS. 7A and 7B, the example process of FIG. 7A may be used to implement the apparatuses 300, 400, and 500 of FIGS. 3, 4, and 5. The example process of 7B may be used to implement the apparatus 300 of FIG. 3 and the apparatus 600 of FIG. 6. The example process of FIG. 7A trains a model with historical sensor data to provide to the process of FIG. 7B to predict an anomaly of real-time sensor data. The training program of FIG. 7A begins at block 702 when the example data interface 110 (FIG. 3) obtains historical monitored system data. For example, the data interface 110 may collect sensor data over time from sensors of the sensor deployment 200 of FIG. 2 and store the sensor data in the operational database 310 (FIG. 3) for future analysis by the example batch model updater 312 (FIG. 3). In some examples, the data interface 110 obtains sensor data of similar sensors proximately located in the sensor deployment 200. In some examples, the data interface 110 obtains heterogenous sensor data from the sensor deployment 200. The example feature extractor 402 of FIG. 4 extracts features of the historical data (block 704) of the monitored system 108. For example, the example batch model updater 312 retrieves the historical monitored system data from the example operational database 310 and provides it to the feature extractor 402. At block 706, the example feature extractor 402 generates a feature vector corresponding to the extracted features of the historical data. For example, the extracted features may include variables of temperature, acceleration, descriptive pixel values of an image, etc. The example feature extractor 402 provides the generated feature vector to the example model trainer 404 (FIGS. 4 and 5). In some examples, if the data interface obtains heterogenous sensor data, the sensor data aggregator 502 (FIG. 5) provides a feature vector to the model trainer 404 including aggregated sensor data. At block 708, the example model trainer 404 determines if there is additional historical data to obtain corresponding to the example monitored system 108 of FIG. 1. For example, the model trainer 404 needs to receive historical data of the monitored system 108 that is sufficient to generate a sufficiently accurate and/or precise model. If the example model trainer 404 should retrieve additional historical data to achieve a sufficiently accurate and/or precise model, control returns to block 702. If the example model trainer 404 is not to retrieve additional historical data, control advances to block 710 at which the example model trainer 404 trains a model based on the feature vector(s). For example, the model trainer 404 may utilize a machine learning technique to predict output probability values corresponding to the operation of the example monitored system 108. The output probability values could correspond to future predictions on temperature readings from temperature sensors proximately located in the manufacturing environment 102 or the output probability values could correspond to future predictions of a temperature value from a thermal imaging camera in the manufacturing environment 102. After the model has been trained, it is flagged as new and/or updated by the example model updater 406. At block 712, the example model generator 408 generates the trained model. For example, the model generator 408 receives the new and/or updated trained model from the model updater 406 and generates a file to store/save the trained model for subsequent access by the model publisher 314 (FIG. 3). At block 714, the example model publisher 314 publishes the model to facilitate anomaly detection by the example data analyzer 112 (FIG. 3). The example process of FIG. 7A ends.

Turning to FIG. 7B, the example data analyzer 112 (FIG. 3) obtains sensor data of the example monitored system 108 (block 716) from the example operational database 310. The sensor data of the example monitored system 108 could represent temperature data of temperature sensors proximately located to one another or it could represent sensor data from heterogenous sensors. The example feature extractor 602 (FIG. 6) is provided with the sensor data of the example monitored system 108 and extracts features of the sensor data (block 718). For example, the feature extractor 602 may extract features of data that are different than the features extracted from the historical data at block 704 of FIG. 7A because the feature extractor 602 is operating to perform near real-time analytics of real-time sensor data from the sensors of the monitored system 108 whereas the features extracted at block 704 are based on historical data.

At block 720, the example feature extractor 602 generates a feature vector corresponding to extracted features of sensor data. For example, the feature vector may provide a number of features corresponding to the sensor data of the monitored system 108 such as temperature variables provided by multiple temperature sensors in proximity to one another, variables of an image captured by a camera and digital logic variables of an IR sensor, etc. At block 722, the example feature extractor 602 provides a feature vector to the published model in the example inference generator 604 (FIG. 6). For example, the inference generator 604 periodically receives updated models trained to predict an operation of sensors in an example monitored system 108.

The example inference generator 604 generates a prediction value (block 724) corresponding to a likelihood that the sensor data is operating in an intended manner. For example, the prediction value may be a numeric value between the numbers zero and one, in which the smallest value of zero represents a prediction that the sensors are malfunctioning and the largest value of one represents a prediction that the sensors are operating in an intended manner. For sensors that are proximately located to one another, the example inference generator 604 may generate a prediction value of a first sensor of a first type based on the sensor data of a second sensor of the first type. For heterogenous sensors, the example inference generator 604 may generate a prediction value of a first sensor of a first type based on the sensor data of a second sensor of a second type. In such example, both the first sensor type and the second sensor type monitor the same sub-system of the monitored system 108.

The example anomaly detector 114 determines if an anomaly is detected (block 726). For example, the anomaly detector 114 can utilize a statistical-based algorithm that can determine if a sensor is malfunctioning, is tampered with, etc. based on the prediction value. At block 728, if the example anomaly detector 114 determines that the inference generator 604 does not detect an anomaly, the process of FIG. 7B ends. However, if the example anomaly detector 114 does determine, at block 728, an anomaly was detected by the inference generator 604, the example anomaly detector 114 flags the data as anomalous (block 730). In some examples, the anomaly detector 114 receives a prediction value of each sensor corresponding to a deviation of sensor data values from a correct sensor operation. The prediction values may be between zero and one, the smallest value of zero representing no deviation to the correct sensor data values and the largest value one representing a threshold deviation to the correct sensor data values that determines the values are skewed. For example, the if anomaly detector 114 receives a prediction value of a first sensor that is 0.12 and a prediction value of a second sensor that is 0.81, the example anomaly detector 114 flags the data of the second sensor with the 0.81 deviation as anomalous, because the prediction value representing the second sensor is near a threshold deviation value. In the same example, the first sensor with the 0.12 prediction value does not meet a threshold deviation value and is, therefore, not considered deviated from a correct sensor operation.

The example notifier 116 notifies the example system applicator 118 (FIG. 1) to modify the example monitored system 108 (block 732). For example, the notifier 116 may use operational technology (OT) to deliver anomaly alerts through frameworks (e.g., mobile push notifications, logs, emails, etc.) selected for use with monitoring the example monitored system 108.

Figure 8:
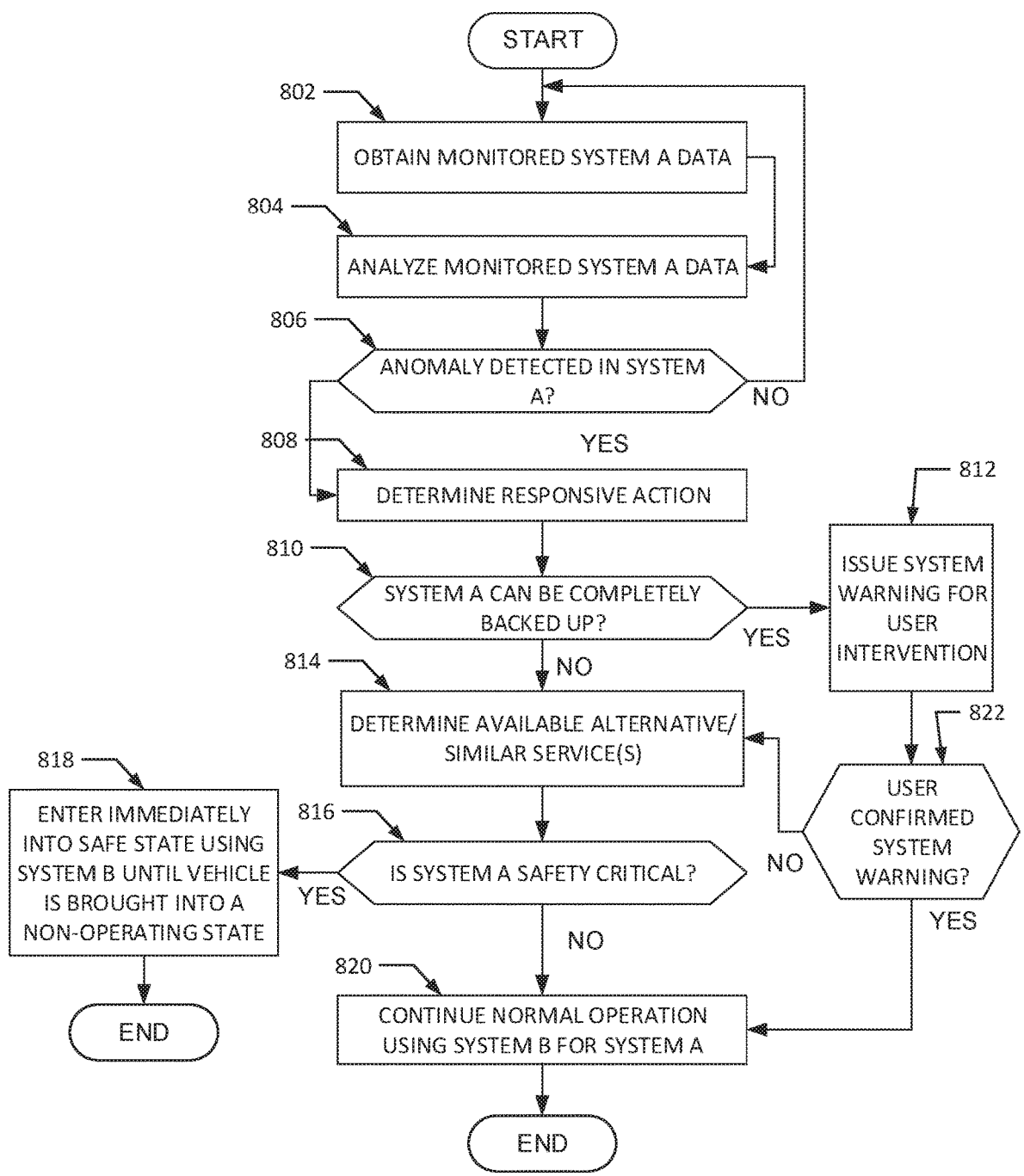
FIG. 8 depicts a flowchart representative of machine readable instructions which may be executed to implement the example apparatus of FIG. 1 to detect an anomaly of a monitored system.

A second example manner to implement the apparatus 100 of FIG. 1 is provided by the process of FIG. 8. The example process of FIG. 8 enables an example vehicle 104 to operate in a safe state by utilizing data from two different systems operating in the example vehicle 104. For example, the process described in conjunction with FIG. 8 determines if a first system, intended for a use different than a second system, can override control of the second system to allow the vehicle 104 to operate safely. The example process of FIG. 8 may determine if a first system can completely override the second system without hindering operation of the vehicle 104.

The process of FIG. 8 begins at block 802 at which the data interface 110 (FIG. 1) obtains monitored system A data from the example vehicle 104. In some examples, system A data can represent data of a steer-by-wire sub-system (e.g., a sub-system that provides steering control of a car). In other examples, the system A data can represent data of a global positioning system (GPS) in the vehicle 104. The example data analyzer 112 (FIG. 1) analyzes the monitored system A data (block 804) to determine a prediction value corresponding to an anomaly in system A data. For example, the data analyzer 112 may utilize a convolutional neural network (CNN), a one-class support vector machine, a Bayesian network, a density-based technique, etc. to predict an output of the system A data. For example, the predicted output (e.g., prediction values) represents a deviation of current sensor data from historical sensor data (e.g., intended and/or correct sensor data)

The example data analyzer 112 provides the prediction values to the example anomaly detector 114 to determine if an anomaly is detected in system A (block 806). For example, an anomaly may constitute a failure of or tampering with the system A. If, at block 806, the example anomaly detector 114 does not detect an anomaly, control returns to block 802. If, at block 806, the example anomaly detector 114 determines that an anomaly was detected in the system A data, control advances to block 808 where the example system applicator 118 determines a responsive action. For example, the anomaly detector 114 may determine that a steer-by-wire sub-system will fail, flags the data as anomalous, and provides, the flagged data to the example notifier 116 to notify the example system applicator 118 that the steer-by-wire sub-system will fail. In this manner, the system applicator 118 can determine a responsive action to mitigate the failure. In other examples related to the GPS system of the vehicle 104, the anomaly detector 114 may determine that the GPS system has failed and follows the same steps to block 808. In any case, example responsive actions include using a back-up system, shutting the system down if it can be done to avoid more damage or future mishap, and/or other suitable response to reduce or eliminate negative consequences of the anomaly. Other actions may be scheduling a service appointment for the vehicle 104.

The example system applicator 118 determines whether system A can be completely backed up (block 810). For example, if the data analyzer 112 is analyzing the data of the GPS system, it may determine that a second system, such as a coupled smart phone, can provide the same services as the GPS system to navigate a user operating the example vehicle 104. If the example system applicator 118 determines that the system A can be completely backed up, it issues a system warning for user intervention (block 812) to inform the user of the vehicle 104 of the alternative option for system A. For example, the system applicator 118 may issue a request for a user, via an electronic display (e.g., a liquid crystal display (LCD)) in the vehicle 104, to permit the apparatus 100 to modify and/or switch from the GPS system to the coupled smart phone to navigate the user operating the vehicle 104. After the system applicator 118 issues a system warning, it waits to receive a user confirmation of the system warning (block 822). For example, if the user authorizes use of the alternative operation noted in the system warning, the system applicator 118 may apply system B and continue normal operation using system B for system A (block 820). In some examples, the user may decline the alternative option noted in the system warning (block 822), and the system applicator 118 may determine other suitable available alternative/similar services (block 814) to use based on the predicted data. For example, the system applicator 118 determines a second system that can reproduce similar actions (e.g., steering) for the vehicle 104 as the steer-by-wire mechanism. In this example, the system applicator 118 may determine that the brake-by-wire sub-system (e.g., a system that controls the brakes of a car) can produce a similar action. For example, in the steering context, independent and differential control of the left-side wheels and right-side wheels can produce a similar steering action as a steering subsystem of the vehicle 104. After the user has confirmed or declined the system warning, the process of FIG. 8 ends.

Returning to block 810, if the example system applicator 118 determines that system A cannot be completely backed up, then it determines an available alternative and/or a similar service for system A (block 814). The example system applicator 118 then determines if system A is safety critical (block 816) to providing a safe state to the example vehicle 104. If the example system applicator 118 determines that the system A is safety critical, then it configures the vehicle 104 to enter immediately into a safe state using system B until the vehicle 104 is brought into a non-operating state (block 818). For example, if the system applicator 118 determines that the steer-by-wire mechanism, if failing, could harm a person in the vehicle 104 or a person outside the vehicle 104, it deems that system A is safety critical and utilizes system B (e.g., the brake-by-wire mechanism) to apply pressure to the brakes until accelerometers of the vehicle's 104 have determined that the vehicle 104 is no longer operating (e.g., moving). After the system applicator 118 configures the vehicle 104 to operate in a safe state (block 818), the process of FIG. 8 ends.

If, at block 816, the system applicator 118 determines system A is not safety critical, the system applicator 118 configures the vehicle 104 to continue normal operation using system B in place of system A. For example, if the steer-by-wire sub-system is not flagged as safety critical, the system applicator 118 configures the brake-by-wire sub-system to steer the example vehicle 104. For example, a car can be steered by independently controlling the rotations of all four wheels based on brake forces applied by the brake-by-wire sub-system. When the example system applicator 118 configures system B to provide a normal operation of anomalous system A, the process ends.

Figure 9A:
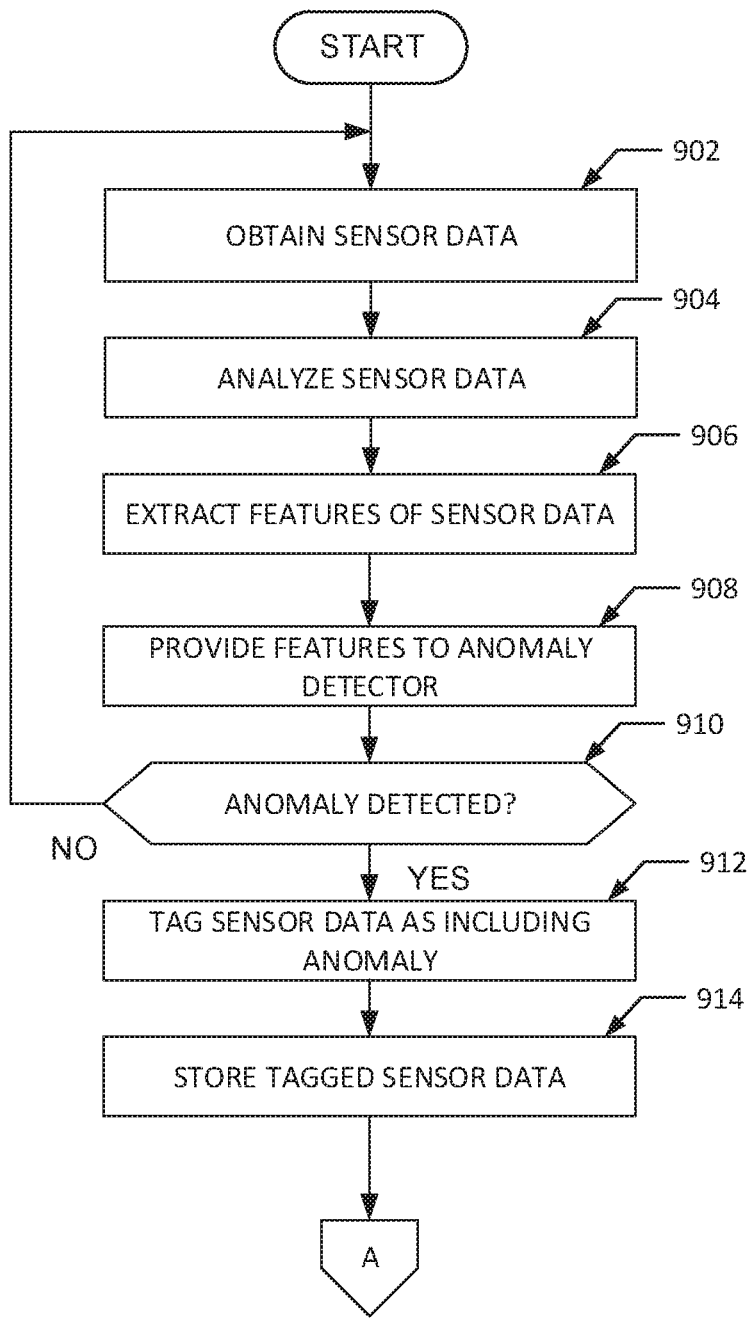
FIGS. 9A and 9B depict a flowchart representative of machine readable instructions which may be executed to implement the example apparatus of FIG. 1 to detect an anomaly of a monitored system.
Figure 9B:
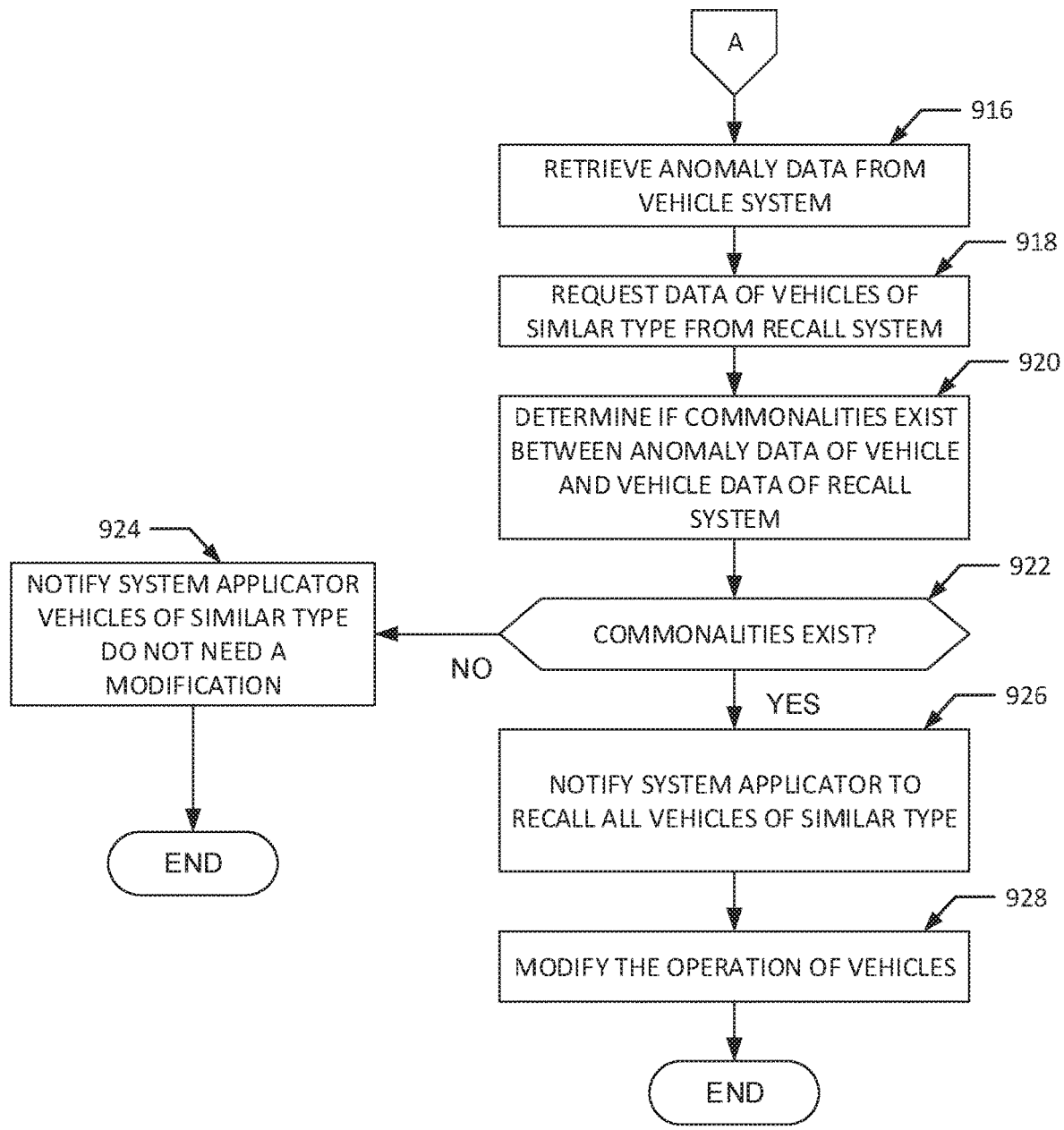

A third example manner to implement the apparatus 100 is provided by the processes of FIGS. 9A and 9B. These processes enable an example recall system 106 to determine if a problem is an anomaly to one specific vehicle or if the problem is anomalous across all vehicles of the recall system 106. The example recall system 106 is a computer-based system that informs users, sellers, and/or manufacturers that a deployed fleet of vehicles includes one or more faulty systems, incorrect instruction manuals, etc. that could be safety critical to a user. Additionally, the process of FIGS. 9A and 9B may enable a recall system 106 to determine if a problem is anomalous to any type of product, such as one specific product or across an entire set of products. For example, a recall system 106 may include manufacturing equipment, health care systems, food processing products, etc.

The process of FIG. 9A begins at block 902 when the example data interface 110 (FIG. 1) obtains sensor data of a vehicle in the example recall system 106. The sensor data is operation and measurement data that provides feedback from sensors that monitor the sub-systems of a vehicle. The example data analyzer 112 analyzes the sensor data (block 904). For example, the data analyzer 112 builds patterns and correlations between the provided sensor data. The example data analyzer 112 extracts features of the sensor data (block 906) corresponding to operation of the vehicle. For example, the data analyzer 112 may extract features corresponding to electrical currents, fuel injection performance, passenger restraint mechanisms, transmission performance, breaking performance, steering performance, etc.

The example data analyzer 112 provides values corresponding to the features to the example anomaly detector 114 (block 908). The example anomaly detector 114 determines if an anomaly is detected in the features (block 910). For example, the anomaly detector 114 receives the output of the data analyzer 112, which may utilize zero-shot learning to predict an output probability of the vehicle sensor, to determine if the output probabilities constitute the data as anomalous. As used herein, zero-shot learning is defined as a process that recognizes new categories or sets of data without having training examples. This is done by providing a high-level description of the new categories or data sets and correlating them to categories or data sets previously learned by the data analyzer 112.

If, at block 910, an anomaly is not detected, control returns to block 902 at which the example data interface 110 obtains additional sensor data from the example recall system 106. If, at block 910, the anomaly detector 114 does detect an anomaly in the sensor data of the vehicle, it tags and/or flags the sensor data as including an anomaly (block 912). For example, the anomaly detector 114 tags or flags the sensor data by logging a corresponding record in the operational database 310 (FIG. 3) with a bit value or a numeric value indicative of the anomaly. The example system applicator 118 stores the tagged sensor data in a memory (e.g., the operational database 310, the non-volatile memory 1216, the volatile memory 1214, the local memory 1213, etc.) (block 914).

The process continues at block 916 of FIG. 9B at which the example data interface 110 retrieves tagged anomaly data pertaining to the vehicle of the recall system 106. The data analyzer 112 requests data of a plurality of other vehicles of similar type (block 918). For example, if the sensor data of FIG. 9A corresponds to a Jeep Liberty model automobile, the data interface 110 may request sensor data corresponding to a plurality of Jeep Liberty model automobiles. When the example data interface 110 receives sensor data corresponding to a plurality of vehicles of similar type, it provides all the data to the example data analyzer 112 to determine a probability value indicative of the likelihood that the data of the recall system 106 is similar to the data of the anomalous vehicle. For example, the data analyzer 112 may utilize a statistical-based algorithm, a probability density function, etc. to determine the probability values.

The example anomaly detector 114 analyzes the probability values to determine if commonalties exist between anomalous data of the vehicle and the data of the plurality of other vehicles in the recall system (block 920). For example, if there is a correlation between the features of the anomalous data pertaining to the first vehicle and the features of the data provided by the recall system 106 for the other vehicles, then the anomaly detector 114 will determine that a recall of all the vehicles of the deployed fleet should be applied. If the example anomaly detector 114 determines there is no correlation between the first vehicle features of anomalous data and features of the data provided by the recall system for the other vehicles, then there will not be a recall of all the vehicles of the deployed fleet.

If, at block 922, the example anomaly detector 114 determines that commonalities do not exist between the two data sets, the example notifier 116 provides a notification to the example system applicator 118 that vehicles of similar type do not need a modification (block 924). For example, by not detecting a correlation at block 922, the anomaly detector determines that the anomaly of the vehicle does not represent a fleet-wide problem affecting a significant number of vehicles for which a recall is necessary to fix/modify the vehicles. The example process ends after the example system applicator 118 is notified. However, if at block 922, the example anomaly detector 114 determines that commonalities do exist between the two data sets, the example notifier 116 notifies the system applicator 118 to recall vehicles of similar type (block 926). For example, the recall of sample model vehicles is due to data across an entire fleet of vehicles in the recall system 106 indicating similar anomaly characteristics. The system applicator 118 modifies the operation of the vehicles (block 928). The process of FIG. 9B then ends.

Figure 10A:
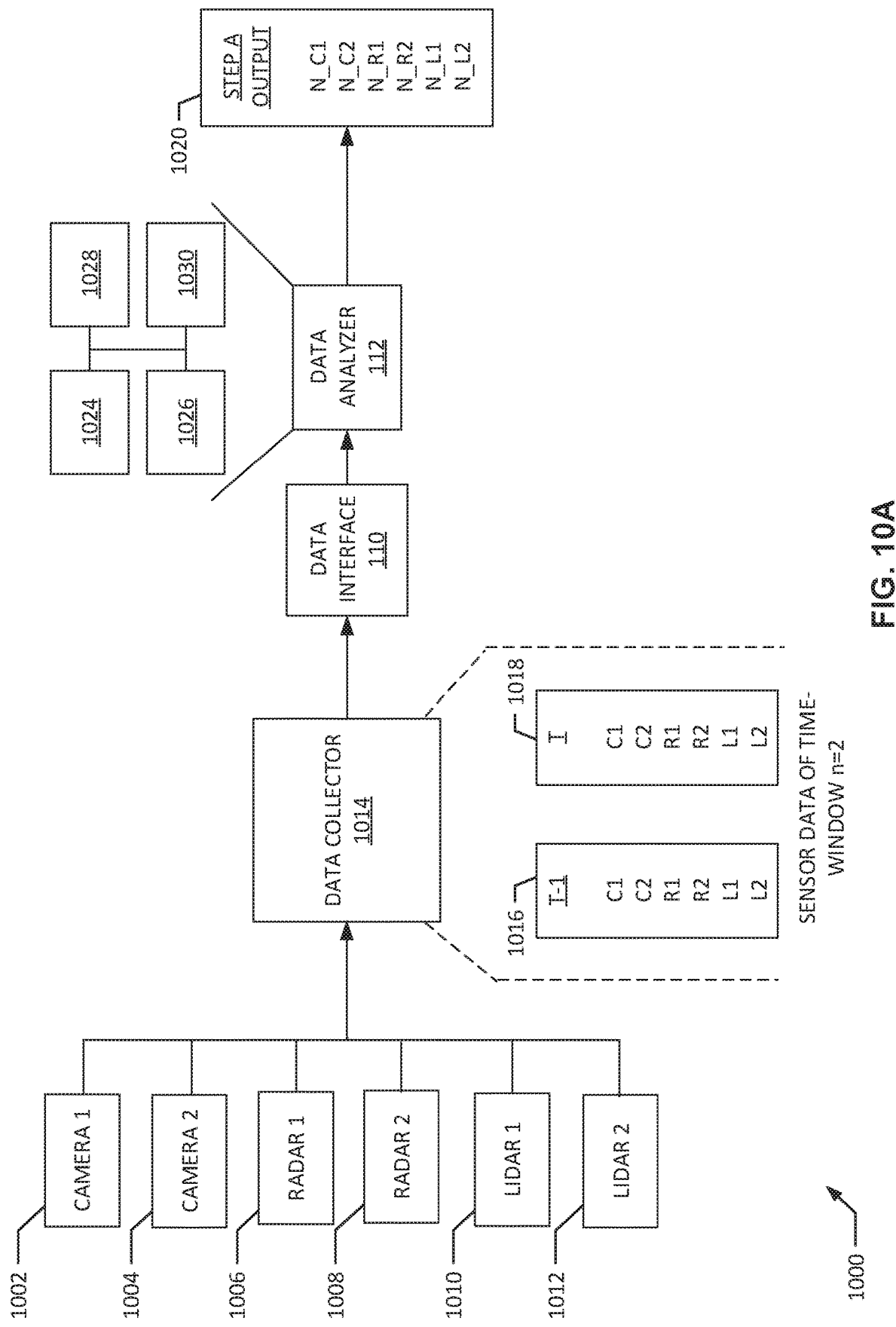
FIGS. 10A, 10B, and 10C are block diagrams of an example hybrid detection apparatus that may be implemented in connection with the example apparatus of FIG. 1 to detect and classify an anomaly.
Figure 10B:
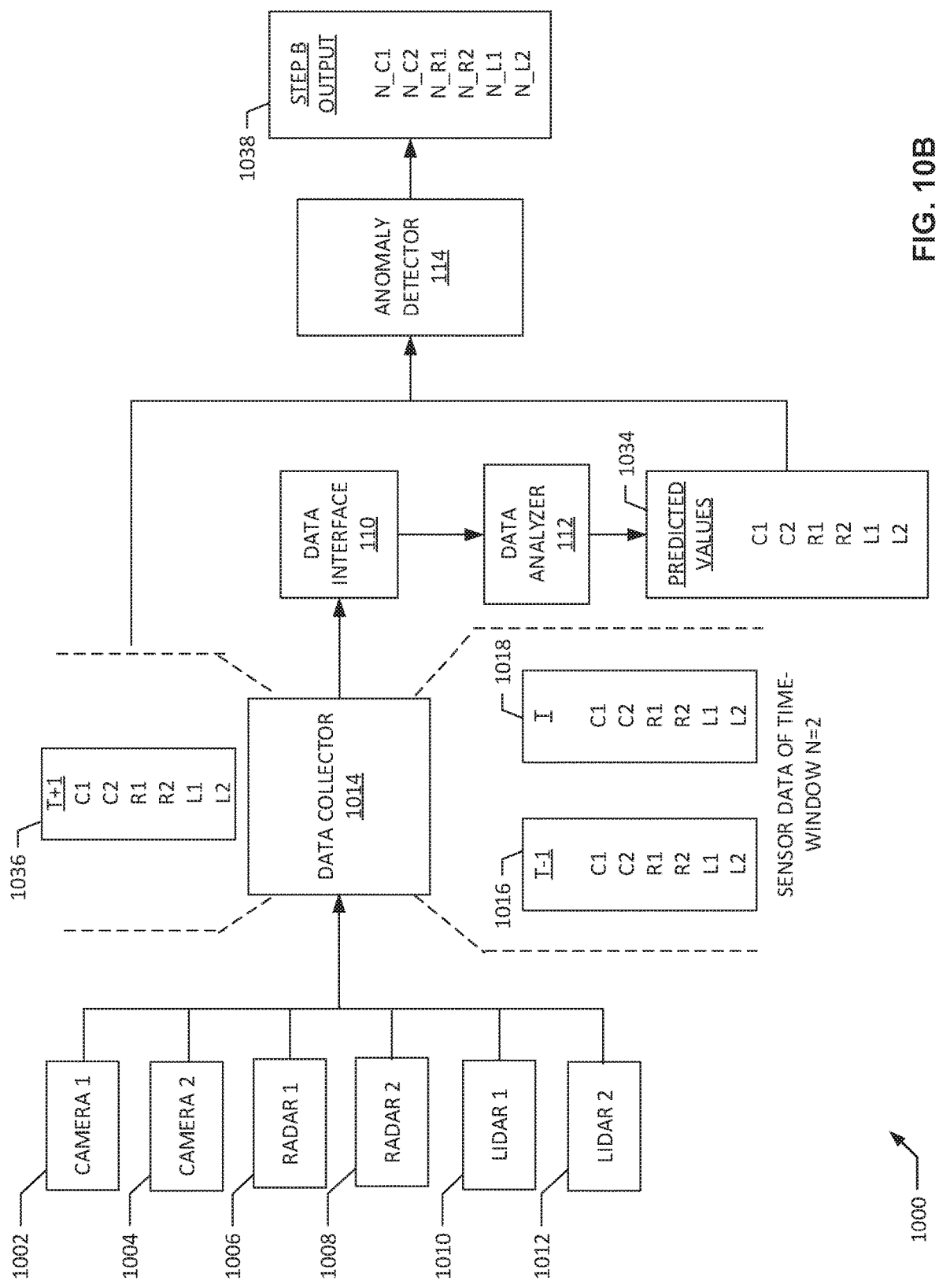
Figure 10C:
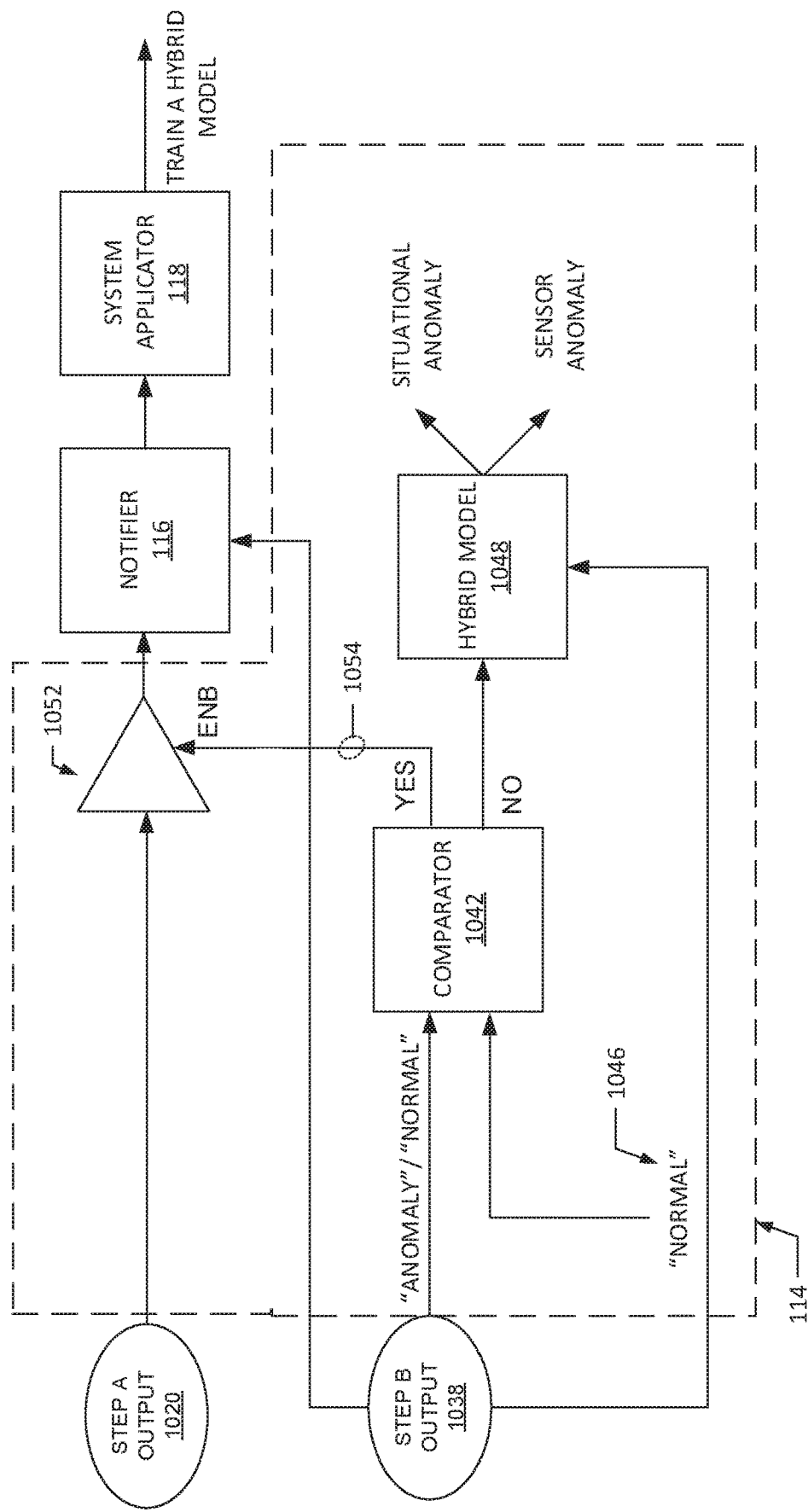

The example hybrid detection system 1000 of FIGS. 10A, 10B, and 10C allows a vehicle 104 or any other type of monitored system 108 to operate in a broad set of situations reliably. For example, the hybrid detection system 1000 allows the system applicator 118 to modify a system only if an absolute sensor anomaly is detected in the system instead of a situational anomaly in which a system would not need to be modified. It is useful for a system to detect when a sensor is malfunctioning and when a sensor is not malfunctioning to properly operate a vehicle.

FIGS. 10A, 10B, and 10C illustrate additional example features that may be implemented with the apparatus 100 of FIG. 1 to determine if a detected anomaly is due to a sensor anomaly or a situational anomaly. As used herein, a situational anomaly is defined as a deviation of sensor values relative to sensor values detecting an intended surrounding environment. A situational anomaly in which the anomaly does not correspond to a malfunction of operation in a sensor but instead corresponds to a sensor detecting a strange and/or abnormal event in a monitored system 108 (FIG. 1). For example, a camera on a vehicle may generate blurred/dark images that are unreadable due to bird feces on the camera's lens rather than damage to the camera such as the lens having a crack or the image data processor malfunctioning in the camera. FIGS. 10A, 10B, and 10C illustrate a hybrid detection system 1000 in which two different types of prediction outputs are utilized to classify an anomaly. For example, FIG. 10A depicts an example step A to produce a step A output 1020 in the hybrid detection system 1000, FIG. 10B depicts an example step B to produce a step B output 1038 in the hybrid detection system 1000, and FIG. 10C shows how the anomaly detector 114 processes the step A output 1020 and the step B output 1038 to train a hybrid detection model and utilize the hybrid detection model to classify the type of anomaly. As shown in FIGS. 10A and 10B, the example hybrid detection system 1000 includes example sensors 1002, 1004, 1006, 1008, 1010, and 1012, an example data collector 1014, the example data interface 110, the example data analyzer 112, and the example anomaly detector 114. The example step A output 1020 of FIG. 10A is a list of scores corresponding to ones of the sensors 1002, 1004, 1006, 1008, 1010, and 1012 and represents likelihoods that the sensors are producing anomalous data. The example step B output 1038 of FIG. 10B is a list of distance values corresponding to the deviation of predicted future sensor values and original future sensor values of the sensors 1002, 1004, 1006, 1008, 1010, and 1012 to determine if the sensors are producing anomalous data.

The example hybrid detection system 1000 is provided with the sensors 1002, 1004, 1006, 1008, 1010, and 1012 to provide data to the data collector 1014. For example, a first camera 1002 and a second camera 1004 may capture a plurality of images of a monitored system 108 during a period of time and provide the captured image data to the data collector 1014. An example first radar 1006 and an example second radar 1008 may capture a plurality of distance values corresponding to the example monitored system 108 during a period of time and provide the distance values to the example data collector 1014. An example first lidar 1010 and an example second lidar 1012 may also capture a plurality of distance values corresponding to the example monitored system 108 and provide the distance values to the example data collector 1014.

The example of hybrid detection system 1000 is provided with the data collector 1014 to collect sensor data of a monitored system 108, log the sensor data with corresponding time stamps, group the sensor data according to time frames corresponding to their timestamps, and generate corresponding time-windows of length n. In the illustrated example, "n" represents a number of units of any suitable unit of time (e.g., milliseconds, seconds, minutes, etc.). For example, a high time resolution application for analyzing quick changes in a scene may use a milliseconds unit of time so that consecutive images are captured at a time resolution of milliseconds apart. However, a low time resolution application for analyzing more gradual changes in a scene or less granular changes may use a seconds or minutes unit of time to capture longer time-specified images at a time resolution of minutes apart. For example, if n=2 in the time-window length, the data collector 1014 will generate a list of sensor data having a time stamp at time T−1 shown as an example first time frame 1016, and a list of sensor data having a time stamp at time T shown as an example second time frame 1018. For example, the data collector 1014 collects sensor data at 10:59 a.m. (e.g., time T−1) and groups it into the first time frame 1016, and may collect sensor data at 11:00 a.m. (e.g., time T) and group it into the second time frame 1018. In some examples, if n=3 for the time-window length, the data collector 1014 will generate a third time frame of sensor data having a time stamp at time T−2. In such examples, if the unit of time is milliseconds, the data collector 1014 collects three (n=3) time windows of data spaced apart by a number of specified milliseconds. If the unit of time is seconds, the data collector 1014 collects three (n=3) time windows of data spaced apart by a number of specified seconds.

The example hybrid detection system 1000 of FIG. 10A is provided with the example data interface 110 to obtain the sensor data of a time-window length n and provide the sensor data to the data analyzer 112. The example data interface 110 is implemented in a similar manner as described above in conjunction with FIGS. 1 and 3.

The example hybrid detection system 1000 of FIG. 10A is provided with the data analyzer 112 to obtain the sensor data from the data interface 110 and generate a score for each sensor. As used herein, a score is a probability value between 0 and 1 representing a likelihood that a sensor is anomalous. For example, if the sensor is assigned a score of 1, it is anomalous and if a sensor is assigned a score of 0, it is operating at a satisfactory state. A value between 0 and 1 represents a corresponding lower likelihood (e.g., closer to 0) or higher likelihood (e.g., closer to 1) of an anomaly. In some examples, the data analyzer 112 utilizes a rules-based system to store and manipulate knowledge in a useful way. In the example of FIG. 10A, a rules-based system is constructed of four components to make inferences on input data. The first component is an example rules repository 1024 storing rules representing facts about the operation of an example monitored system 108 and the environment in which the monitored system 108 operates. The second component is an example inference engine 1026 which infers information based on the interaction of input data and the rules of the first component. The third component is an example memory 1028 to temporarily hold information available for processing. The fourth component is an example input/output interface 1030 to receive input data from the data interface 110 and transmit output scores (e.g., to a separate system, to the notifier 116, etc.). The four components operate in cooperation to generate separate scores for corresponding ones of the sensors 1002, 1004, 1006, 1008, 1010, and 1012 to assist the anomaly detector 114 in detecting if a sensor is anomalous.

In the example hybrid detection system 1000 of FIG. 10A, the data analyzer 112 generates and outputs the example step A output 1020 that includes a list of scores based on input sensor data of corresponding ones of the sensors 1002, 1004, 1006, 1008, 1010, and 1012. In the illustrated example, the data analyzer 112 provides the step A output 1020 to a tri-state buffer 1052 shown in FIG. 10C. In some examples, the step A output 1020 can be stored in memory for future use by the anomaly detector 114.

FIG. 10B depicts an example step B of the example hybrid detection system 1000 in which the data analyzer 112 predicts future values of corresponding ones of sensors 1002, 1004, 1006, 1008, 1010, and 1012 to assist in detecting anomalous sensor data and assist in generating a hybrid model 1048 described below in connection with FIG. 10C. The example step B is an alternative method to detect anomalous sensor data in the example hybrid detection system 1000 to broaden the scope of the example hybrid model 1048 to accurately classify if anomalous sensor data is situational (e.g., normal) or sensor (e.g., anomalous).

In FIG. 10B, the example hybrid detection system 1000 uses the data analyzer 112 to generate prediction values of the input sensor data (e.g., in the first time frame 1016 and the second time frame 1018) by using a long short term memory (LSTM) based recurrent neural network (RNN). As used herein, a long short term memory based recurrent neural network is defined as an algorithm which sequences predictions based on its inputs. Sequencing predictions means that the LSTM-based RNN generates predictions by using historical sensor time values to predict the next sensor time values. For example, the data analyzer 112 utilizes the LSTM-based RNN to generate prediction values corresponding to future sensor values. Predicted future sensor values are sensor values that the sensors 1002, 1004, 1006, 1008, 1010, 1012 are expected to produce at a future time (e.g., a time T+1) when operating in a satisfactory manner (e.g., a non-anomalous manner). The output of the example data analyzer 112 is depicted as the example predicted values list 1034. In some examples, the predicted values list 1034 is a prediction of a distance measurement at time T+1 of the example first radar sensor 1006.

In FIG. 10B, the example hybrid detection system 1000 stores actual future sensor data values of the example sensors 1002, 1004, 1006, 1008, 1010, and 1012 corresponding to a future time (e.g., T+1) in an example third time frame 1036. For example, the actual future values of the third time frame 1036 may be collected in a different time window than the first time frame 1016 and the second time frame 1018 and registered by the data collector 1014 with a time stamp of time T+1. The example data collector 1014 provides the third time frame 1036 of actual future values as an input to the example anomaly detector 114.

In the illustrated example of FIG. 10B, to determine a deviation between predicted future values of the sensors 1002, 1004, 1006, 1008, 1010, and 1012 and actual values thereof, the anomaly detector 114 utilizes a distance algorithm to determine a real number, which represents the distance between two points in a N-dimensional space, where N is the number of sensors 1002, 1004, 1006, 1008, 1010, and 1012. Example distance algorithms that can be used include the Euclidian model, the Mahalanobis model, etc. Each of these models compares data of two or more sensors of similar and/or different units (e.g., meters, degrees, inches, pounds, etc.) to determine how "far away" (e.g., deviation) they are from each other. The distance between sets of values (e.g., a predicted value relative to an actual value) is defined as a standard deviation between the values. For example, if the distance is 0 between two values, there is no deviation between them, and they both are the same or have the same mean. If the distance is greater than zero, there is a deviation, and the greater the distance, the greater the deviation. By determining the distance between the actual future values of the third time frame 1036 and the predicted values 1034, the example anomaly detector 114 can determine if the predicted values 1034 vary from the actual future values 1036 of the sensors by a threshold. If there is a deviation that satisfies (e.g., exceeds) the threshold, the future values 1036 are detected as anomalous.

The example step B output 1038 is a set of data corresponding to real numbers associated with the distance between two points in N-dimensional space (e.g., an actual future value and a predicted value). The example step B output 1038 includes metadata, generated by the anomaly detector 114, describing if the future values 1036 of the sensors 1002, 1004, 1006, 1008, 1010, and 1012 are within a threshold deviation of the predicted values 1034. For example, the metadata may be a string of characters or a value to provide information to an example comparator 1042 of FIG. 10C describing if an anomaly was detected in the example sensors 1002, 1004, 1006, 1008, 1010, and 1012. For example, when the anomaly detector 114 detects that the first camera 1002 is anomalous based on the step B output values 1038 not satisfying the threshold, the anomaly detector 114 generates a character string "anomaly" or a bit value representative of a detected anomaly and provides the character string or bit value to the comparator 1042. In some examples, the anomaly detector 114 generates a bit value of 1 to confirm a detected anomaly or a bit value of 0 to confirm that an anomaly was not detected. For example, the anomaly detector 114 may generate a bit value of 1 and provide it to the comparator 1042 to describe that the first camera 1002 is anomalous.

In FIG. 10C, the example hybrid model 1048 discussed below is a product (e.g., a support vector machine) of a training operation that utilizes a set of non-anomalous data to generate an algorithm that assigns new examples to one category (normal) and learns what normal sensor outputs are (e.g., how sensors should operate in the example monitored system 108). The example hybrid model 1048 is the reassurance step in the hybrid detection system 1000 that double checks (e.g., further classifies) the sensor data.

FIG. 10C depicts an example manner in which the example anomaly detector 114 processes the step A output 1020 and the step B output 1038. The example step B output 1038 is provided to the example comparator 1042 to compare the step B output 1038 to a reference input 1046 representative of "normal." The example comparator 1042 makes a decision about the existence of an anomaly based on the comparison between the step B output 1038 and the reference input 1046. In the illustrated example, the reference input 1046 is a string of characters "normal" but may be any other string or value representing non-anomalous, normal data. In some examples, the reference input 1046 into the comparator 1042 is a bit value of 0 to represent normal. When the example anomaly detector 114 generates the metadata for the example step B output 1038, it provides the metadata and the distance values to the comparator 1042 which compares the metadata to the reference input 1046. The example comparator 1042 determines if the metadata of the step B output 1038 equals the reference input 1046. Based on the comparison result, the comparator 1042 provides the step B output 1038 to an example hybrid model 1048 of the example anomaly detector 114, or to an example tri-state buffer 1052 to enable the example anomaly detector 114 to train a new hybrid model.

When the example comparator 1042 determines that "YES" the step B output 1038 metadata is equal to the reference input 1046, the step B output 1038 is provided to the tri-state buffer 1052 to enable the apparatus 100 to enter into a training mode to generate a hybrid model utilizing scores in the step A output 1020. In some examples, if the comparator 1042 determines that "NO" the step B output 1038 metadata is not equal to the reference input 1046, then the step B output 1038 is provided to the hybrid model 1048 to classify the sensor data into situational or sensor anomaly. In examples disclosed herein, the "YES" output from the comparator 1042 is a bit value of 0 or 1, the bit value 0 being provided to the tri-state buffer 1052 when the step B output 1038 metadata is not equal to the reference input 1046, and the bit value 1 being provided to the tri-state buffer 1052 when the step B output 1038 metadata is equal to the reference input 1046. In examples disclosed herein, the "NO" output from the comparator 1042 is a bit value of 0 or 1, the bit value 0 being provided to the hybrid model 1048 when the step B output 1038 metadata is equal to the reference input 1046, and the bit value 1 being provided to the hybrid model 1048 when the step B output 1038 metadata is not equal to the reference input 1046.

If the example comparator 1042 determines that the step B output 1038 metadata equals the reference input 1046, an enable control signal 1054 is provided to the example tri-state buffer 1052 to enable the training mode of the example apparatus 100. As used herein, a tri-state buffer is defined as an input controlled switch including a data input (e.g., the sensor scores of step A output 1020) and the enable control signal 1054 (e.g., the output signal from the comparator 1042). The enable control signal 1054 enables a communication path through the tri-state buffer 1052 allowing the step A output 1020 to propagate through from the input to the output of the tri-state buffer 1052. For example, the comparator 1042 may output a logic high (e.g., a bit value 1) when it has determined that the step B output 1038 is not anomalous, to enable the tri-state buffer 1052 to enable the communication path and provide the step A output 1020 to the notifier 116. In some examples, the step A output 1020 is continuously provided to the tri-state buffer 1052 until the tri-state buffer 1052 is enabled.

When the tri-state buffer 1052 is enabled, it provides the example notifier 116 with a request or trigger to the example system applicator 118 to train a hybrid model. For example, the notifier 116 may provide the step A output 1020 sensor scores to the system applicator 118 along with a request to train a hybrid model utilizing the sensor scores. In some examples, the system applicator 118 may provide the step A output 1020 to the data interface 110, store the sensor data, and notify the data analyzer 112 to train a hybrid model. The example data analyzer 112 may retrieve the step A output 1020 sensor scores and generate a hybrid model associated with the sensor scores of the step A output 1020. The example hybrid model may be a one-class support vector machine, a Bayesian network, a recurrent neural network, etc., to learn from the input data and classify it into anomalous or normal. The trained hybrid model may be published by the example model publisher 314 of FIG. 3 or the example data analyzer 112 and stored in the example operational database 310 or a memory located in the example monitored system 108.

The example anomaly detector 114 of FIG. 10C is provided with the hybrid model 1048 to classify anomalous data as a situational anomaly or a sensor anomaly. For example, if the comparator 1042 determines that the metadata of the step B output 1038 does not match the reference input 1046 (e.g., an anomaly is detected), the comparator 1042 provides distance values of the step B output 1038 to the hybrid model 1048 to analyze the distance values and determine if they are normal or anomalous. In this manner, the normal output of the example hybrid model 1048 is defined as a situational anomaly and is represented as normal to indicate that the monitored system 108 is not malfunctioning and does not need a corrective action to any of its sub-systems. The anomalous output of the example hybrid model 1048 is defined as a sensor anomaly and is represented as anomalous to indicate that the monitored system 108 is malfunctioning and a corrective action should be applied to the anomalous sensors. For example, if the step B output 1038 of the hybrid detection system 1000 determines that the sensor data of the predicted values list 1034 and the data of the actual future values 1036 of the third time frame 1036 not being normal (e.g., anomalous), that did not define the sensors as malfunctioning, instead it defined the sensors as producing not normal data.

While an example manner of implementing the apparatus 100 of FIG. 1 is illustrated in FIGS. 10A, 10B, and 10C, one or more of the elements, processes and/or devices illustrated in FIGS. 10A, 10B, and 10C may be combined, divided, re-arranged, omitted, eliminated and/or implemented in any other way. Further, the example data collector 1014, the example data interface 110, the example data analyzer 112, the example anomaly detector 114, the example rules repository 1024, the example inference engine 1026, the example working memory 1028, the example input/output interface 1030, the example comparator 1042, the example tri-state buffer 1052 and/or, more generally, the example hybrid detection system 1000 of FIG. 1 may be implemented by hardware, software, firmware and/or any combination of hardware, software and/or firmware. Thus, for example, any of the example data collector 1014, the example data interface 110, the example data analyzer 112, the example anomaly detector 114, the example rules repository 1024, the example inference engine 1026, the example working memory 1028, the example input/output interface 1030, the example comparator 1042, the example tri-state buffer 1052 and/or, more generally, the example hybrid detection system 1000 could be implemented by one or more analog or digital circuit(s), logic circuits, programmable processor(s), programmable controller(s), graphics processing unit(s) (GPU (s)), digital signal processor(s) (DSP(s)), application specific integrated circuit(s) (ASIC(s)), programmable logic device (s) (PLD(s)) and/or field programmable logic device(s) (FPLD(s)). When reading any of the apparatus or system claims of this patent to cover a purely software and/or firmware implementation, at least one of the example data collector 1014, the example data interface 110, the example data analyzer 112, the example anomaly detector 114, the example rules repository 1024, the example inference engine 1026, the example working memory 1028, the example input/output interface 1030, the example comparator 1042, and the example tri-state buffer 1052 is/are hereby expressly defined to include a non-transitory computer readable storage device or storage disk such as a memory, a digital versatile disk (DVD), a compact disk (CD), a Blu-ray disk, etc. including the software and/or firmware. Further still, the example hybrid detection system 1000 of FIG. 1 may include one or more elements, processes and/or devices in addition to, or instead of, those illustrated in FIGS. 10A, 10B, and 10C, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 11A:
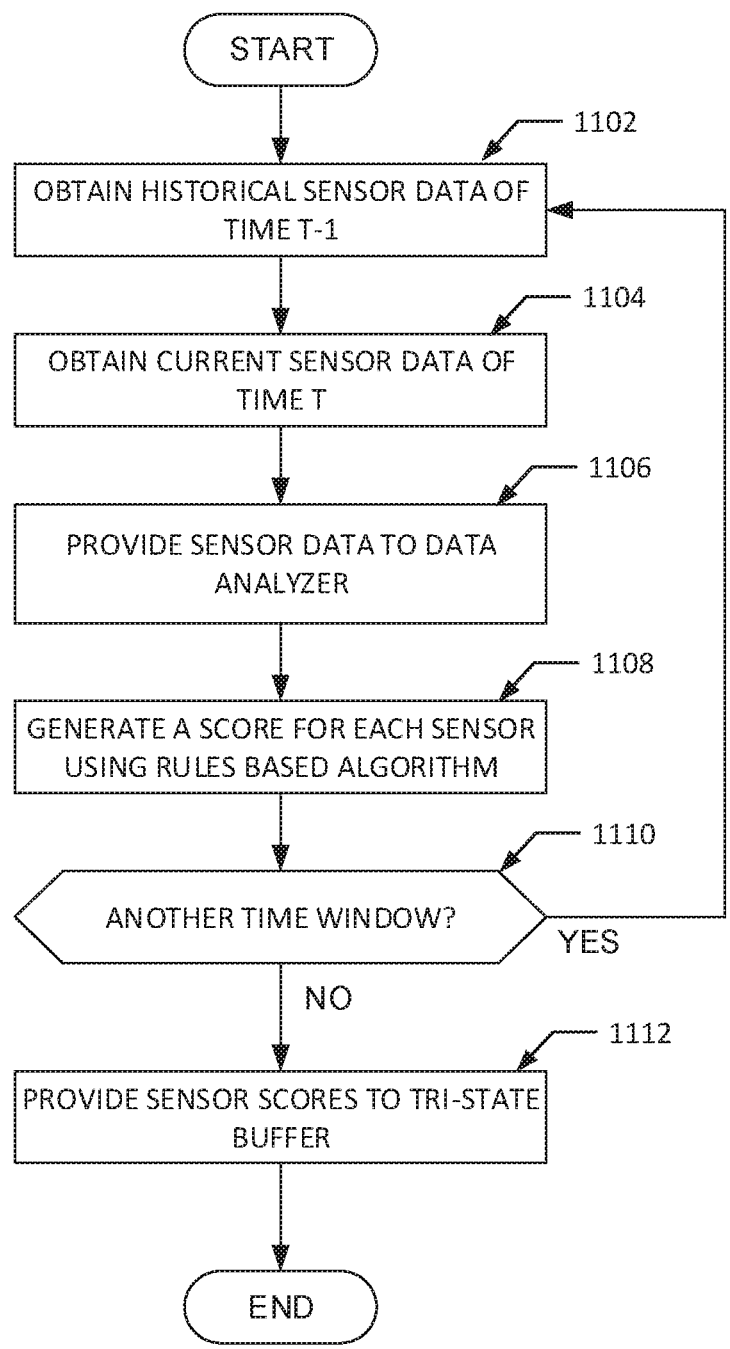
FIGS. 11A, 11B, and 11C depict a flowchart representative of machine readable instructions which may be executed to implement the example apparatus of FIGS. 1, 10A, 10B, and 10C to detect and classify an anomaly of a monitored system.
Figure 11B:
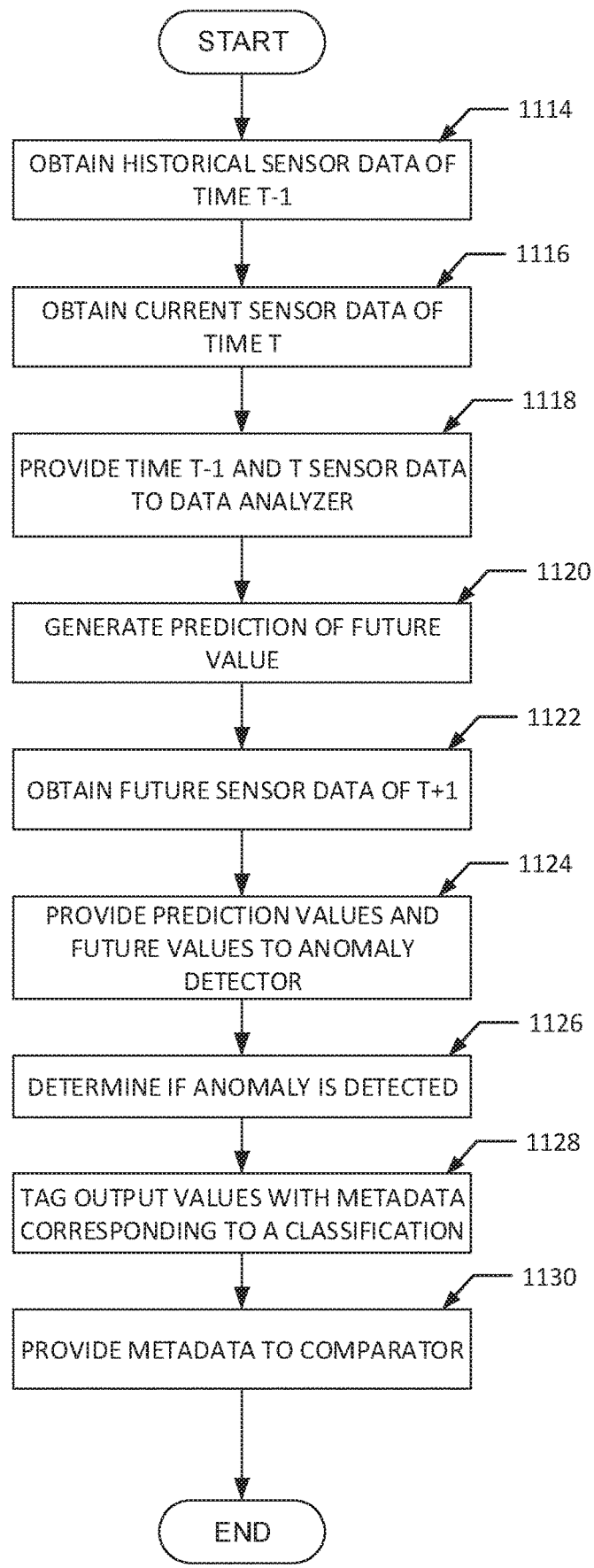
Figure 11C:
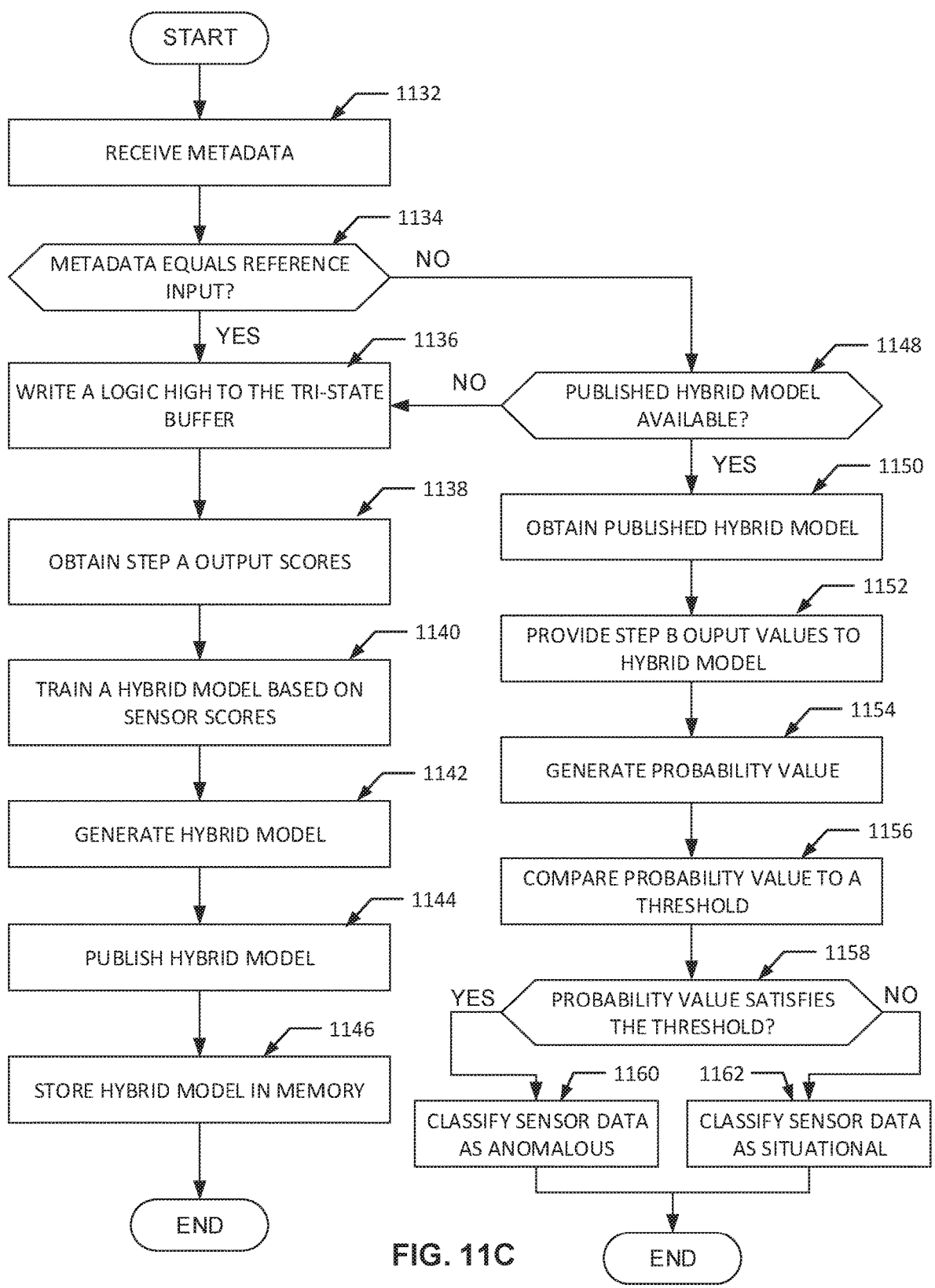

A flowchart representative of example hardware logic, machine readable instructions, hardware implemented state machines, and/or any combination thereof for implementing the hybrid detection system 1000 of FIGS. 10A and 10B is shown in FIGS. 11A, 11B, and 11C. The machine readable instructions may be an executable program or portion of an executable program for execution by a computer processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 11A, 11B, and 11C, many other methods of implementing the example hybrid detection system 1000 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 11A, 11B, and 11C may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

The step A program of FIG. 11A begins at block 1102 when the example data interface 110 obtains historical sensor data of a first time frame 1016 (T−1) from the example data collector 1014 to provide to the example data analyzer 112. The example data interface 110, at block 1104, obtains current sensor data of a second time frame 1018 (T) from the example data collector 1014 to provide to the example data analyzer 112. In some examples, the data collector 1014 may collect sensor data from a specific time window of length n and register that data with a timestamp corresponding to a time frame.

The example data interface 110 provides the sensor data to the example data analyzer 112 (block 1106). The example data analyzer 112 utilizes the sensor data of different time frames as an input to a rules-based system which generates a score for each sensor (block 1108). The score generated by the example data analyzer 112 is a probability value between zero and one representing the likelihood that a sensor is anomalous. The example data analyzer 112 determines if another time window of data needs to be analyzed (block 1110). For example, the rules-based system of the example data analyzer 112 may not have sufficient sensor data to generate a score for each sensor, the score generated by the data analyzer 112 may not have represented that an anomaly was detected and the data analyzer 112 may request to check a different set of sensor data to make sure the sensors are operating properly, etc.

If the example data analyzer 112, at block 1110, determines the operation of step A is complete and the sensor data of a different time window does not need to be processed, then the process continues to block 1112 at which the data analyzer 112 provides the sensor scores to the example tri-state buffer 1052 (FIG. 10C). For example, the data analyzer 112 may utilize the rules-based system to generate a step A output 1020 which is provided as a list of scores, a matrix of scores, a vector, etc., to the tri-state buffer 1052. If the example data analyzer 112, at block 1110, determines that the operation of step A is not complete, and another time window of sensor data does need to be processed, control returns to block 1102.

Turning to FIG. 11B, the program of step B begins at block 1114 where the example data interface 110 obtains historical sensor data of the first time frame 1016 (T−1) from the example data collector 1014. The example data interface 110, at block 1116, obtains current sensor data of a second time frame 1018 (T) from the example data collector 1014. In some examples, the data collector 1014 may collect sensor data from a specific time window of length n and register that data with a timestamp corresponding to a time frame.

The example data interface 110 provides the sensor data of the first time frame 1016 (T−1) and the second time frame 1018 (T) to the example data analyzer 112 (block 1118). The example data analyzer 112 generates prediction values (block 1120), For example, the example data analyzer 112 utilizes a long short term memory (LSTM) based recurrent neural network (RNN) to generate prediction values corresponding to future sensor values (block 1120) for each sensor based on their corresponding output values provided in the example time frames. For example, the data analyzer 112 may use the sensor values of the of the example time frames as an input to the LSTM-based RNN which outputs a predicted values list 1034 which is a new set of values corresponding to each sensor and representing a prediction of what the future values of the sensors may be.

The example data interface 110 obtains the sensor values from a third time frame 1036 (block 1122) which correspond to actual future values of the sensors. For example, the data collector 1014 may collect the actual future values of the third time frame 1036 in a different time window than the first time frame 1016 and the second time frame 1018 and registered by the data collector 1014 with a time stamp of time T+1. The example data interface 110 provides the future values of the third time frame 1036 to the example anomaly detector 114 and the example data analyzer 112 provides the predicted values list 1034 to the example anomaly detector 114 (block 1124). In some examples, the anomaly detector 114 utilizes a distance algorithm to determine a real number which represents the distance between two points in N-dimensional space, where N is the number of different sensors 1002, 1004, 1006, 1008, 1010, and 1012. The step B output 1038 is a set of data corresponding to real numbers associated with the distance between two points in N-dimensional space.

The example anomaly detector 114 determines if an anomaly is detected (block 1126). For example, the anomaly detector 114 compares the distance between the actual future value of the third time frame 1036 and the predicted value 1034 to a threshold which is a value associated with what the maximum deviation (e.g., distance) between two variables can be before they are considered anomalous. If the example anomaly detector 114 determines the there is a deviation that satisfies (e.g., exceeds) the threshold, the future values 1036 are detected as anomalous and the example anomaly detector 114 tags the future values 1036 with metadata corresponding to their classification (block 1128). For example, the anomaly detector 114 generates the metadata as a character string "anomaly" or a bit value representative of a detected anomaly and provides the character string or bit value in the form of metadata to the comparator 1042 (FIG. 10C) (block 1130).

Turning to program FIG. 11C, the process begins at block 1132 when the example comparator 1042 the metadata from the hybrid detection system 1000 (FIG. 10B). For example, the comparator 1042 may receive a string of characters or a bit value identifying if the sensor data was detected as anomalous or normal by the operation of step B in the hybrid detection system 1000. The example comparator 1042 determines if the metadata equals the reference input 1046 (block 1134). For example, the comparator 1042 compares the metadata to a reference input 1046 that is a string of characters "normal" or any other string or value representing non-anomalous, normal data (e.g., a bit value 0, etc.).

If the example comparator 1042, at block 1134, determines the metadata equals the reference input 1046, the example comparator 1042 writes a logic high to the example tri-state buffer 1052 (block 1136) to enable it. For example, the comparator 1042 may provide a constant logic low signal (e.g., zeros) to the example tri-state buffer 1052 until it determines that the control input (e.g., step B output 1038 metadata) equals the reference input 1046, at which time it would output a logic high signal (e.g., a one) to enable a communication path through the tri-state buffer 1052 for the step A output 1020 scores.

The example notifier 116 obtains the step A output 1020 scores (block 1138) and provides them, along with a trigger, to the example system applicator 118 to trigger the apparatus 100 to train a hybrid model 1048. For example, by enabling the tri-state buffer 1052, the step A output 1020 scores can be sent to any location to which the output of the tri-state buffer 1052 is communicatively and/or wirelessly coupled. The example system applicator 118 obtains the step A output 1020 scores (block 1138) after the example notifier 116 provides a request to the system applicator 118 to train a model. The example system applicator 118 notifies the example data analyzer 112 that a model needs to be trained using the step A output 1020 scores. The example data analyzer 112 trains a hybrid model 1048 based on the sensor scores (block 1140). For example, the data analyzer 112 may train a support vector machine with the sensor scores to categorize the scores in a sensor anomaly category or a situational anomaly category. The example data analyzer 112 may generate the hybrid model 1048 (block 1142) to be published. For example, the data analyzer 112 may generate the support vector machine after it has been trained with new data (e.g., step A output 1020 scores). The data analyzer 112 may publish the hybrid model 1048 (block 1144) to be stored in its memory and used during a detection mode. The example data analyzer 112 stores the hybrid model 1048 in memory (block 1146)

If the example comparator 1042, at block 1134, determines the metadata is not equal to the reference input 1046, control advances to block 1148 at which the example anomaly detector 114 determines if a published hybrid model 1048 is available. For example, the anomaly detector 114 may query a memory to determine if there is a model that can be utilized to detect the type of anomaly identified in the step B output 1038. If there is not a published model available, control returns to block 1136 at which the example tri-state buffer 1052 triggers the notifier 116 to request the example system applicator 118 to train a hybrid model 1048 based on the scores from the step A output 1020.

If the anomaly detector 114 determines if there is a published hybrid model 1048 available, the control advances to block 1150 where the example anomaly detector 114 obtains the published hybrid model 1048 from the example data analyzer 112. The example anomaly detector 114 provides the step B output 1038 values to the published hybrid model 1048 (block 1152) to be classified into one of two categories. For example, the step B output 1038 values, if provided to the hybrid model 1048, were detected as anomalous in step B but the type of anomaly was not determined.

The example hybrid model 1048 generates a probability value (block 1154) corresponding to a likelihood that the step B output 1038 is in a situational anomaly category or a sensor anomaly category. The example hybrid model 1048 compares the probability value to the threshold (block 1156). For example, the threshold is a maximum range that a probability value can be before the probability value is considered as satisfying (e.g., exceeding) the threshold. The example anomaly hybrid model 1048 determines if the probability value satisfies the threshold (block 1158). For example, the threshold is a value between 0 and 0.5 corresponding to a likelihood that a probability value is a situational anomaly. If the example hybrid model 1048 determines the probability value satisfies (e.g., exceeds) the threshold, then the hybrid model 1048 classifies corresponding ones of the sensors 1002, 1004, 1006, 1008, 1010, and 1012 as anomalous (block 1160). For example, if the hybrid model 1048 classifies the ones of sensors 1002, 1004, 1006, 1008, 1010, and 1012 as anomalous, then the example anomaly detector 114 detects a malfunction in the sensors and the example system applicator 118 will need to modify an operation of the monitored system 108.

If the example hybrid model 1048 determines the probability value does not satisfy the threshold, then the hybrid model 1048 classifies the ones of the sensors 1002, 1004, 1006, 1008, 1010, and 1012 as situational anomalies (block 1162). For example, ones of sensors 1002, 1004, 1006, 1008, 1010, and 1012 that are situational are detecting abnormal yet actual situation in an environment, and the example system applicator 118 will not need to modify an operation of the monitored system 108.

The processes of 11A, 11B, and 11C end when the example apparatus 100 has identified if an anomaly has been detected in the monitored system 108 and further detected the type of anomaly.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 12:
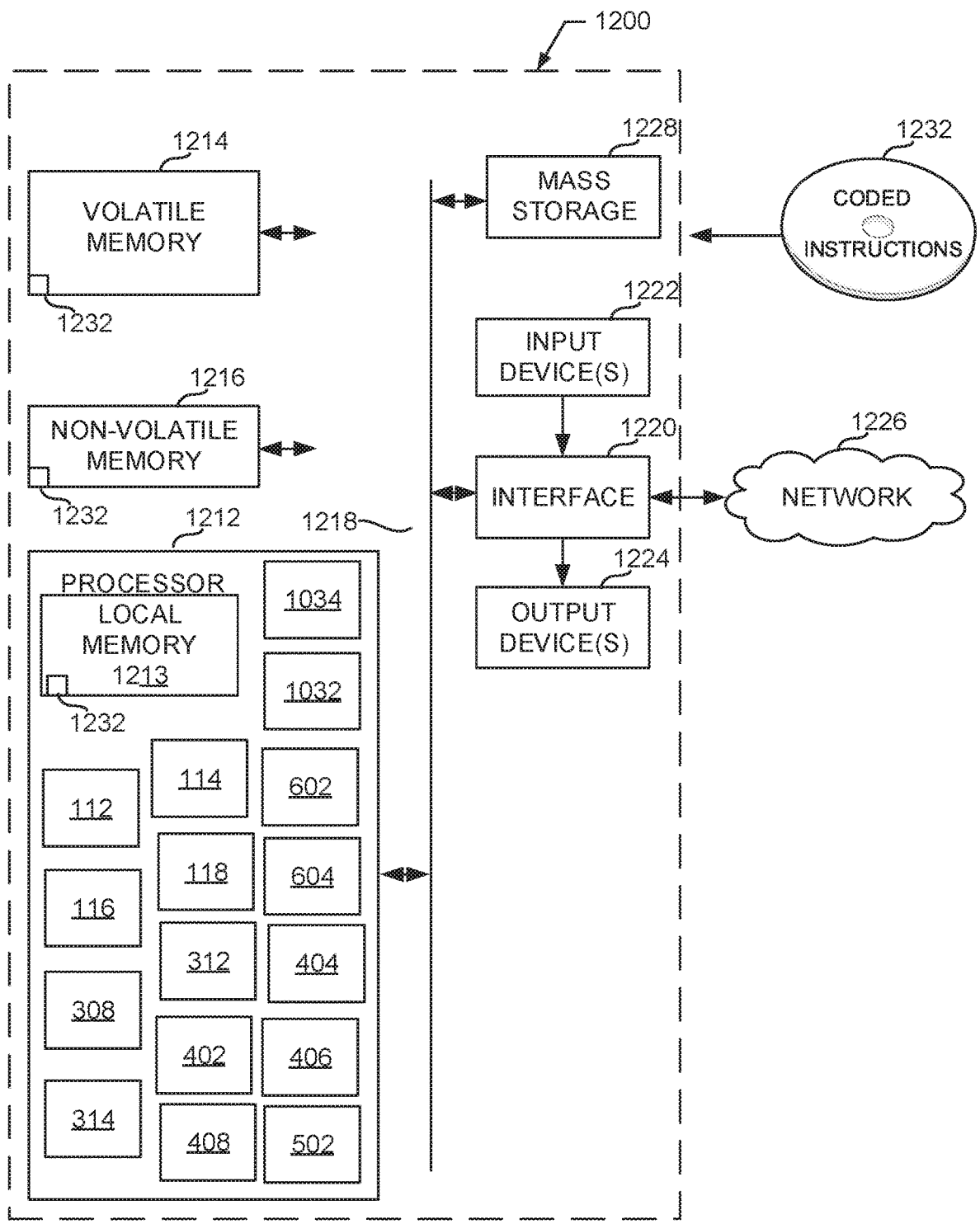
FIG. 12 is a block diagram of an example processing platform structured to execute the instructions of FIGS. 7A, 7B, 8, 9A, 9B, and 11A, 11B, and 11C to implement the example apparatus of FIGS. 1 and 3 to detect an anomaly in a monitored system and modify an operation of the anomalous system.

FIG. 12 is a block diagram of an example processor platform 1200 structured to execute the instructions of FIGS. 7A, 7B, 8, 9A, 9B, 11A, 11B, and 11C to implement the apparatus of FIGS. 1, 3, 4, 5, 6, and 10A, 10B, and 10C. The processor platform 1200 can be, for example, a server, a personal computer, a workstation, a self-learning machine (e.g., a neural network), a mobile device (e.g., a cell phone, a smart phone, a tablet such as an iPad), or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data analyzer 112, the example anomaly detector 114, the example notifier 116, the example system applicator 118, the example data processor 308, the example batch model updater 312, the example model publisher 314, the example feature extractor 402, the example model trainer 404, the example model updater 406, the example model generator 408, the example sensor data aggregator 502, the example feature extractor 602, the example inference generator 604, the example comparator 1042, the example hybrid model 1048 and the example tri-state buffer 1052.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

Example machine executable instructions 1232 represented in FIGS. 7A, 7B, 8, 9A, 9B, 11A, 11B, and 11C may be stored in the mass storage device 1228, in the volatile memory 1214, in the non-volatile memory 1216, and/or on a removable non-transitory computer readable storage medium such as a CD or DVD.

From the foregoing, it will be appreciated that example methods, apparatus and articles of manufacture have been disclosed that increase safety and reduce error in monitored systems by detecting anomalous data of sensors monitoring the systems. The disclosed methods, apparatus and articles of manufacture improve the efficiency of using a computing device by predicting sensor data of a monitored system for future use to detect an anomaly of the monitored system and apply a modification before a system error or malfunction occurs. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example 1 is an apparatus to detect anomalies. The apparatus of Example 1 includes a data interface to obtain first sensor data from a first sensor and second sensor data from a second sensor of a monitored system; a data analyzer to extract a feature based on analyzing the first and second sensor data using a model, the model trained based on historical sensor data, the model to determine the feature as a deviation between the first and second sensor data to predict a future malfunction of the monitored system; an anomaly detector to detect an anomaly in at least one of the first sensor data or the second sensor data based on the feature, the anomaly corresponding to the future malfunction of the monitored system; and a system applicator to modify operation of the monitored system based on the anomaly.

In Example 2, the subject matter of Example 1 can optionally include a gateway to determine the first sensor and the second sensor are of similar type and in proximity to one another, the historical sensor data corresponding to the first sensor and the second sensor, and the gateway to provide the historical sensor data to the data interface.

In Example 3, the subject matter of any one of Examples 1-2 can optionally include that the gateway is to: determine that the first and second sensors form a heterogenous sensor group and are in proximity to one another; and provide the historical sensor data of the heterogenous sensor group to the data interface.

In Example 4, the subject matter of any one of Examples 1-3 can optionally include a batch model updater to generate an updated model based on the historical sensor data, the data analyzer to predict the future malfunction of the monitored system based on the updated model.

In Example 5, the subject matter of any one of Examples 1-4 can optionally include that the anomaly detector is to: detect the anomaly in a first sub-system of the monitored system; and determine whether a function of the first sub-system can be provided by a second sub-system of the monitored system.

In Example 6, the subject matter of any one of Examples 1-5 can optionally include that the system applicator applies a modification to the monitored system when a function of the first sub-system can be provided by the second sub-system.

In Example 7, the subject matter of any one of Examples 1-6 can optionally include the anomaly detector is to: detect the anomaly of a first product based on the historical sensor data pertaining to the first product; and determine if the anomaly exists in the second sensor data pertaining to a plurality of second products.

In Example 8, the subject matter of any one of Examples 1-7 can optionally include that the anomaly detector is to: notify the system applicator to modify the first product exclusive of the second products when the anomaly detector determines the anomaly does not exist in the second sensor data pertaining to the second products.

Example 9 is a non-transitory computer readable storage medium comprising instructions that, when executed, cause a processor at least: obtain first sensor data from a first sensor and second sensor data from a second sensor of a monitored system; extract a feature based on analyzing the first and second sensor data using a model, the model trained based on historical sensor data, the model to determine the feature as a deviation between the first and second sensor data to predict a future malfunction of the monitored system; detect an anomaly in at least one of the first sensor data or the second sensor data based on the feature, the anomaly corresponding to the future malfunction of the monitored system; and modify operation of the monitored system based on the anomaly.

In Example 10, the subject matter of Example 9 can optionally include that the instructions, when executed, cause the processor to determine the first sensor and the second sensor are of similar type and in proximity to one another; and provide the historical sensor data, corresponding to the first sensor and the second sensor, to a data interface.

In Example 11, the subject matter of any one of Examples 9-10 can optionally include that the instructions, when executed, cause the processor to determine that the first and second sensors form a heterogenous sensor group and are in proximity to one another; and provide the historical sensor data of the heterogenous sensor group to a data interface.

In Example 12, the subject matter of any one of Examples 9-11 can optionally include that the instructions, when executed, cause the processor to generate an updated model based on the historical sensor data; and predict the future malfunction of the monitored system based on the updated model.

In Example 13, the subject matter of any one of Examples 9-12 can optionally include that the instructions, when executed, cause the processor to detect the anomaly in a first sub-system of the monitored system; and determine whether a function of the first sub-system can be provided by a second sub-system of the monitored system.

In Example 14, the subject matter of any one of Examples 9-13 can optionally include that the instructions, when executed, cause the processor to apply a modification to the monitored system when a function of the first sub-system can be provided by the second sub-system.

In Example 15, the subject matter of any one of Examples 9-14 can optionally include that the instructions, when executed, cause the processor to: detect the anomaly of a first product based on the historical sensor data pertaining to the first product; and determine if the anomaly exists in the second sensor data pertaining to a plurality of second products In Example 16, the subject matter of any one of Examples 9-15 can optionally include that the instructions, when executed, cause the processor to generate a notification to modify the first product exclusive of the second products when an anomaly detector determines the anomaly does not exist in the second sensor data pertaining to the second products.

Example 17 is a method that includes generating, by executing an instruction with a processor, obtaining, by executing an instruction with a processor, first sensor data from a first sensor and second sensor data from a second sensor of a monitored system; extracting, by executing an instruction with the processor, a feature based on analyzing the first and second sensor data using a model, the model trained based on historical sensor data, the model to determine the feature as a deviation between the first and second sensor data to predict a future malfunction of the monitored system; detecting, by executing an instruction with the processor, an anomaly in at least one of the first sensor data or the second sensor data based on the feature, the anomaly corresponding to the future malfunction of the monitored system; and modifying, by executing an instruction with the processor, operation of the monitored system based on the anomaly.

In Example 18, the subject matter of Example 17 can optionally include determining the first sensor and the second sensor are of similar type and in proximity to one another and, providing the historical sensor data, corresponding to the first sensor and the second sensor, to a data interface.

In Example 19, the subject matter of any one of Examples 17-18 can optionally include determining that the first and second sensors form a heterogenous sensor group and are in proximity to one another, and providing the historical sensor data of the heterogenous sensor group to a data interface In Example 20, the subject matter of any one of Examples 17-19 can optionally include generating an updated model based on the historical sensor data, and predicting the future malfunction of the monitored system based on the updated model.

In Example 21, the subject matter of any one of Examples 17-20 can optionally include detecting the anomaly in a first sub-system of the monitored system and determining whether a function of the first sub-system can be provided by a second sub-system of the monitored system.

In Example 22, the subject matter of any one of Examples 17-21 can optionally include applying a modification to the monitored system when a function of the first sub-system can be provided by the second sub-system.

In Example 23, the subject matter of any one of Examples 17-22 can optionally include detecting the anomaly of a first product based on the historical sensor data pertaining to the first product and, determining if the anomaly exists in the second sensor data pertaining to a plurality of second products.

In Example 24, the subject matter of any one of Examples 17-23 can optionally include notifying a system applicator to modify the first product exclusive of the second products when the anomaly does not exist in the second sensor data pertaining to the second products.

Example 25 is an apparatus to classify an anomaly. The apparatus of Example 25 includes a data analyzer to generate first output data and second output data based on sensor data from a plurality of sensors of a monitored system, the first output data corresponding to likelihoods that ones of the sensors are anomalous, the second output data corresponding to a deviation between a predicted sensor value and an actual sensor value of at least one of the sensors; a hybrid model to, when the second output data is anomalous: classify the second output data as a situational anomaly when at least one of the sensors is operating as intended; and classify the second output data as a sensor anomaly when the at least one of the sensors is not operating as intended; and a system applicator to modify the monitored system based on the sensor anomaly.

In Example 26, the subject matter of Example 25 can optionally include a comparator to determine if the second output data is anomalous by comparing metadata of the second output data to a reference input, the reference input representing non-anomalous data.

In Example 27, the subject matter of any one of the Examples 25-26 can optionally include a data collector to collect the sensor data corresponding to a time window and register the sensor data with a timestamp.

In Example 28, the subject matter of any one of the Examples 25-27 can optionally include that the data analyzer is to generate: the first output data based on a rules-based system; and generate the second output data based on a long short term memory based recurrent neural network.

In Example 29, the subject matter of any one of the Examples 25-28 can optionally include a tri-state buffer to receive an enable signal when metadata corresponding to the second output data matches a reference value indicative of non-anomalous data, the enable signal to cause a training mode to generate a second hybrid model to replace the hybrid model.

In Example 30, the subject matter of any one of the Examples 25-29 can optionally include an anomaly detector to: generate scores for the first output data, the scores corresponding to the likelihoods that ones of the sensors are anomalous; and determine if the predicted sensor value and the actual sensor value of the second output data exceed a threshold.

Example 31 is a non-transitory computer readable storage medium comprising instructions that, when executed, cause a processor at least: generate first output data and second output data based on sensor data from a plurality of sensors of a monitored system, the first output data corresponding to likelihoods that ones of the sensors are anomalous, the second output data corresponding to a deviation between a predicted sensor value and an actual sensor value of at least one of the sensors; classify the second output data as a situational anomaly when the at least one of the sensors is operating as intended; classify the second output data as a sensor anomaly when the at least one of the sensors is not operating as intended; and modify the monitored system based on the sensor anomaly.

In Example 32, the subject matter of Example 31 can optionally include that the instructions, when executed, cause the processor to determine if the second output data is anomalous by comparing metadata of the second output data to a reference input, the reference input representing non-anomalous data.

In Example 33, the subject matter of any one of Examples 31-32 can optionally include that the instructions, when executed, cause the processor to collect the sensor data corresponding to a time window; and register the sensor data with a timestamp.

In Example 34, the subject matter of any one of Examples 31-33 can optionally include that the instructions, when executed, cause the processor to generate the first output data based on a rules-based system; and generate the second output data based on a long short term memory based recurrent neural network In Example 35, the subject matter of any one of Examples 31-34 can optionally include that the instructions, when executed, cause the processor to receive an enable signal when metadata corresponding to the second output data matches a reference value indicative of non-anomalous data, the enable signal to cause a training mode to generate a second hybrid model to replace the hybrid model.

In Example 36, the subject matter of any one of Examples 31-35 can optionally include that the instructions, when executed, cause the processor to generate scores for the first output data, the scores corresponding to the likelihoods that ones of the sensors are anomalous; and determine if the predicted sensor value and the actual sensor value of the second output data exceed a threshold.

Example 37 is a method that includes generating, by executing an instruction with a processor, first output data and second output data based on sensor data from a plurality of sensors of a monitored system, the first output data corresponding to likelihoods that ones of the sensors are anomalous, the second output data corresponding to a deviation between a predicted sensor value and an actual sensor value of at least one of the sensors; classifying, by executing an instruction with the processor, when the second output data is anomalous, the second output data as a situational anomaly when the at least one of the sensors is operating as intended; classifying, by executing an instruction with the processor, when the second output data is anomalous, the second output data as a sensor anomaly when the at least one of the sensors is not operating as intended; and modifying, by executing an instruction with the processor, the monitored system based on the sensor anomaly.

In Example 38, the subject matter of Example 37 can optionally include determining if the second output data is anomalous by comparing metadata of the second output data to a reference input, the reference input representing non-anomalous data.

In Example 39, the subject matter of any one of Examples 37-38 can optionally include collecting the sensor data corresponding to a time window and registering the sensor data with a timestamp.

In Example 40, the subject matter of any one of Examples 37-39 can optionally include generating of the first output data is based on a rules-based system, and the generating of the second output data is based on a long short term memory based recurrent neural network.

In Example 41, the subject matter of any one of Examples 37-40 can optionally include receiving an enable signal when metadata corresponding to the second output data matches a reference value indicative of non-anomalous data, the enable signal to cause a training mode to generate a second hybrid model to replace a training model.

In Example 42, the subject matter of any one of Examples 37-41 can optionally include generating scores for the first output data, the scores corresponding to the likelihoods that ones of the sensors are anomalous; and determining if the predicted sensor value and the actual sensor value of the second output data exceed a threshold.

What is claimed is:

1. An apparatus to detect anomalies, the apparatus comprising:
    a data interface to obtain first sensor data from a first sensor and second sensor data from a second sensor of a monitored system;
    a data analyzer to extract a feature based on analyzing the first and second sensor data using a model, the model trained based on historical sensor data, the model to determine the feature as a deviation between the first and second sensor data to predict a future malfunction of the monitored system;
    an anomaly detector to detect an anomaly in at least one of the first sensor data or the second sensor data based on the feature, the anomaly corresponding to the future malfunction of the monitored system; and
    a system applicator to modify operation of the monitored system based on the anomaly, at least one of the data interface, the data analyzer, the anomaly detector, or the system applicator including a logic circuit.

2. The apparatus as defined in claim 1, further including a gateway to determine the first sensor and the second sensor are of similar type and in proximity to one another, the historical sensor data corresponding to the first sensor and the second sensor, and the gateway to provide the historical sensor data to the data interface.

3. The apparatus as defined in claim 2, wherein the gateway is to:
    determine that the first and second sensors form a heterogenous sensor group and are in proximity to one another; and
    provide the historical sensor data of the heterogenous sensor group to the data interface.

4. The apparatus as defined in claim 1, further including a batch model updater to generate an updated model based on the historical sensor data, the data analyzer to predict the future malfunction of the monitored system based on the updated model.

5. The apparatus as defined in claim 1, wherein the anomaly detector is to:
    detect the anomaly in a first sub-system of the monitored system; and
    determine whether a function of the first sub-system can be provided by a second sub-system of the monitored system.

6. The apparatus as defined in claim 5, wherein the system applicator applies a modification to the monitored system when a function of the first sub-system can be provided by the second sub-system.

7. The apparatus as defined in claim 1, wherein the anomaly detector is to:
    detect the anomaly of a first product based on the historical sensor data pertaining to the first product; and
    determine if the anomaly exists in the second sensor data pertaining to a plurality of second products.

8. The apparatus as defined in claim 7, wherein the anomaly detector is to:
    notify the system applicator to modify the first product exclusive of the second products when the anomaly detector determines the anomaly does not exist in the second sensor data pertaining to the second products.

9. A non-transitory computer readable storage medium comprising instructions that, when executed, cause a processor to at least:
    obtain first sensor data from a first sensor and second sensor data from a second sensor of a monitored system;
    extract a feature based on analyzing the first and second sensor data using a model, the model trained based on historical sensor data, the model to determine the feature as a deviation between the first and second sensor data to predict a future malfunction of the monitored system;
    detect an anomaly in at least one of the first sensor data or the second sensor data based on the feature, the anomaly corresponding to the future malfunction of the monitored system; and
    modify operation of the monitored system based on the anomaly.

10. The non-transitory computer readable storage medium as defined in claim 9, wherein the instructions, when executed, cause the processor to:
    determine the first sensor and the second sensor are of similar type and in proximity to one another; and
    provide the historical sensor data, corresponding to the first sensor and the second sensor, to a data interface.

11. The non-transitory computer readable storage medium as defined in claim 9, wherein the instructions, when executed, cause the processor to:
    determine that the first and second sensors form a heterogenous sensor group and are in proximity to one another; and
    provide the historical sensor data of the heterogenous sensor group to a data interface.

12. The non-transitory computer readable storage medium as defined in claim 9, wherein the instructions, when executed, cause the processor to:
    generate an updated model based on the historical sensor data; and
    predict the future malfunction of the monitored system based on the updated model.

13. The non-transitory computer readable storage medium as defined in claim 9, wherein the instructions, when executed, cause the processor to:
    detect the anomaly in a first sub-system of the monitored system; and
    determine whether a function of the first sub-system can be provided by a second sub-system of the monitored system.

14. The non-transitory computer readable storage medium as defined in claim 13, wherein the instructions, when executed, cause the processor to apply a modification to the monitored system when a function of the first sub-system can be provided by the second sub-system.

15. The non-transitory computer readable storage medium as defined in claim 9, wherein the instructions, when executed, cause the processor to:
    detect the anomaly of a first product based on the historical sensor data pertaining to the first product; and
    determine if the anomaly exists in the second sensor data pertaining to a plurality of second products.

16. The non-transitory computer readable storage medium as defined in claim 15, wherein the instructions, when executed, cause the processor to generate a notification to modify the first product exclusive of the second products when an anomaly detector determines the anomaly does not exist in the second sensor data pertaining to the second products.

17. A method comprising:
    obtaining, by executing an instruction with a processor, first sensor data from a first sensor and second sensor data from a second sensor of a monitored system;
    extracting, by executing an instruction with the processor, a feature based on analyzing the first and second sensor data using a model, the model trained based on historical sensor data, the model to determine the feature as a deviation between the first and second sensor data to predict a future malfunction of the monitored system;
    detecting, by executing an instruction with the processor, an anomaly in at least one of the first sensor data or the second sensor data based on the feature, the anomaly corresponding to the future malfunction of the monitored system; and
    modifying, by executing an instruction with the processor, operation of the monitored system based on the anomaly.

18. The method as defined in claim 17, further including determining the first sensor and the second sensor are of similar type and in proximity to one another and, providing the historical sensor data, corresponding to the first sensor and the second sensor, to a data interface.

19. The method as defined in claim 17, further including determining that the first and second sensors form a heterogenous sensor group and are in proximity to one another, and providing the historical sensor data of the heterogenous sensor group to a data interface.

20. The method as defined in claim 17, further including generating an updated model based on the historical sensor data, and predicting the future malfunction of the monitored system based on the updated model.

21. The method as defined in claim 17, further including detecting the anomaly in a first sub-system of the monitored system and determining whether a function of the first sub-system can be provided by a second sub-system of the monitored system.

22. The method as defined in claim 21, further including applying a modification to the monitored system when a function of the first sub-system can be provided by the second sub-system.

23. The method as defined in claim 17, further including detecting the anomaly of a first product based on the historical sensor data pertaining to the first product and, determining if the anomaly exists in the second sensor data pertaining to a plurality of second products.

24. The method as defined in claim 23, further including notifying a system applicator to modify the first product exclusive of the second products when the anomaly does not exist in the second sensor data pertaining to the second products.

\* \* \* \* \*